United States Patent [19]
Aoki et al.

[11] Patent Number: 5,559,638
[45] Date of Patent: Sep. 24, 1996

[54] WIDE-ANGLE LENS SYSTEM #6

[75] Inventors: Norihiko Aoki, Hachioji; Takanori Yamanashi, Kokubunji; Masashi Hankawa, Hino, all of Japan

[73] Assignee: Olympus Optical Co., Ltd., Tokyo, Japan

[21] Appl. No.: 281,608

[22] Filed: Jul. 28, 1994

[30] Foreign Application Priority Data

Jul. 29, 1993 [JP] Japan .................. 5-205537

[51] Int. Cl.⁶ .................................. G02B 13/04
[52] U.S. Cl. .................. 359/749; 359/653; 359/750
[58] Field of Search .................. 359/749, 750, 359/751, 752, 753, 652, 653, 654

[56] References Cited

U.S. PATENT DOCUMENTS

| | | | |
|---|---|---|---|
| 3,992,085 | 11/1976 | Momiyama | 359/749 |
| 4,025,169 | 5/1977 | Fischer et al. | 359/749 |
| 4,770,512 | 9/1988 | Ikari | 359/749 |
| 4,930,880 | 6/1990 | Miyauchi | 359/653 |

FOREIGN PATENT DOCUMENTS

| | | |
|---|---|---|
| 47-41626 | 12/1972 | Japan . |
| 48-43627 | 6/1973 | Japan . |
| 49-20215 | 5/1974 | Japan . |
| 50-87643 | 7/1975 | Japan . |
| 51-58332 | 5/1976 | Japan . |
| 55-10049 | 3/1980 | Japan . |
| 58-22724 | 5/1983 | Japan . |
| 60-40009 | 9/1985 | Japan . |
| 61-10045 | 3/1986 | Japan . |
| 61-144616 | 7/1986 | Japan . |
| 223309 | 1/1990 | Japan . |

*Primary Examiner*—Scott J. Sugarman
*Attorney, Agent, or Firm*—Cushman, Darby & Cushman

[57] ABSTRACT

A wide-angle lens system comprising, in order from the object side, a front unit, a stop and a rear unit: the front unit comprising, in order from the object side, a first lens unit which comprises a plurality of lens components including a positive lens component and has a negative refractive power as a whole, a negative lens component having a concave surface on the object side and a cemented lens component; and the rear unit comprising a negative lens component disposed on the side of the stop and at least two positive lens components. This wide-angle lens system has sufficiently corrected aberrations, in particular, negative distortion, curvature of field and sagittal coma.

30 Claims, 30 Drawing Sheets

FIG. 11A
SPHERICAL ABERRATION
F/2.02
g d F C
-0.5  0.5

FIG. 11B
ASTIGMATISM
ω38.03°
M S
-0.5  0.5

FIG. 11C
DISTORTION
ω38.03°
-5.0 (%) 5.0

FIG. 11D
LATERAL CHROMATIC ABERRATION
ω38.03°
g F C
-0.05  0.05

FIG. 11E
SAGITTAL COMA
ω38.03°
F d C g
-0.1  0.1

FIG. 11F
SAGITTAL COMA
ω28.60°
F C d g
-0.1  0.1

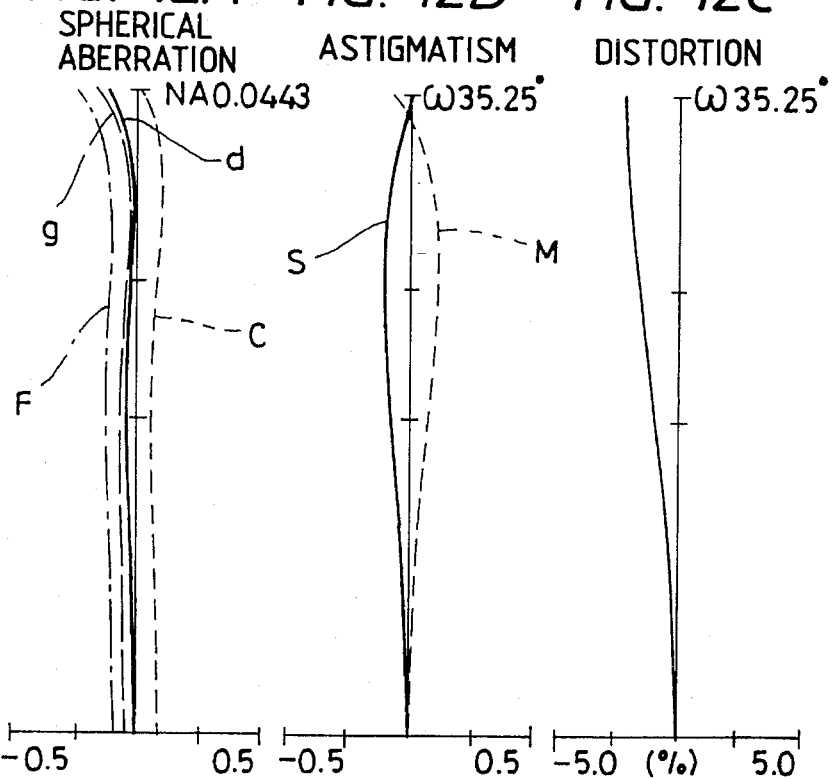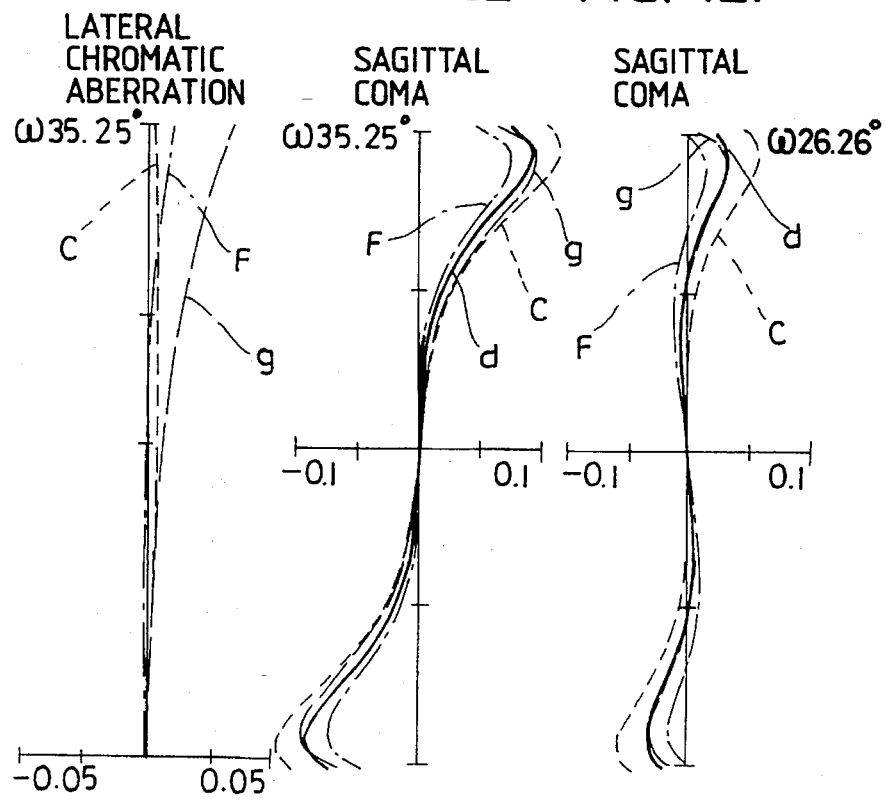

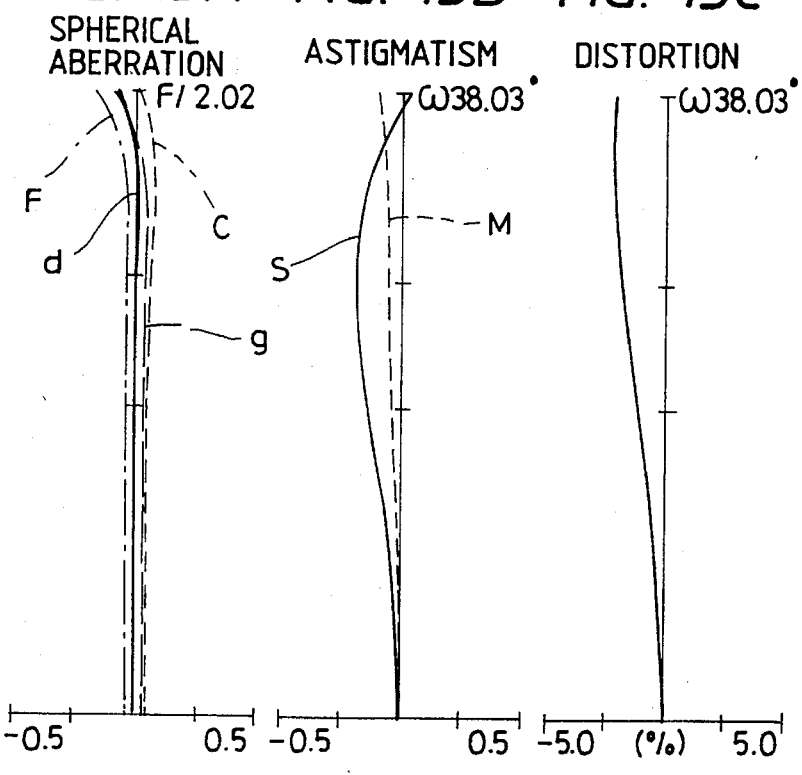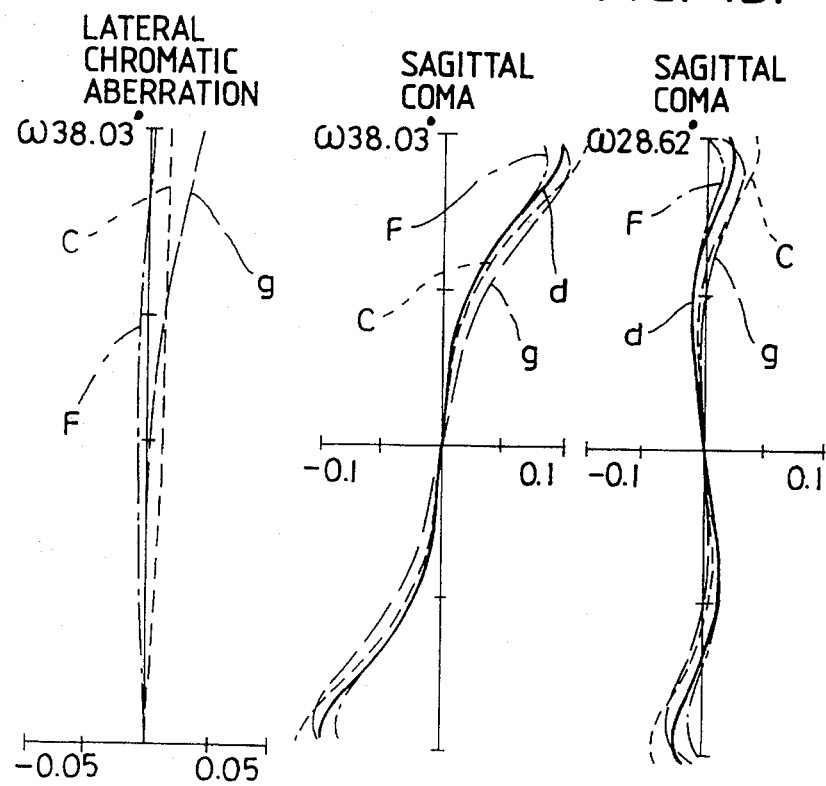

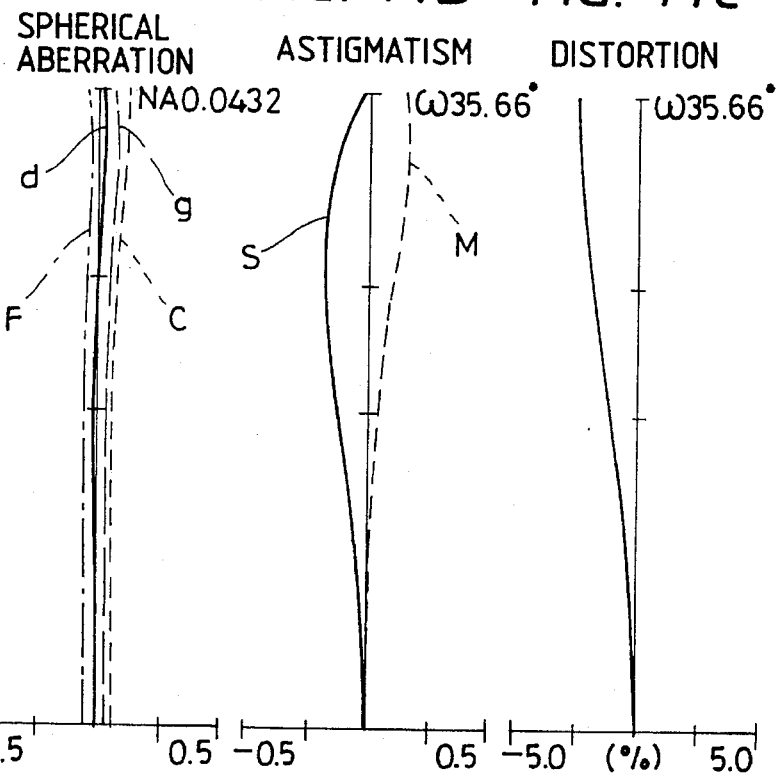
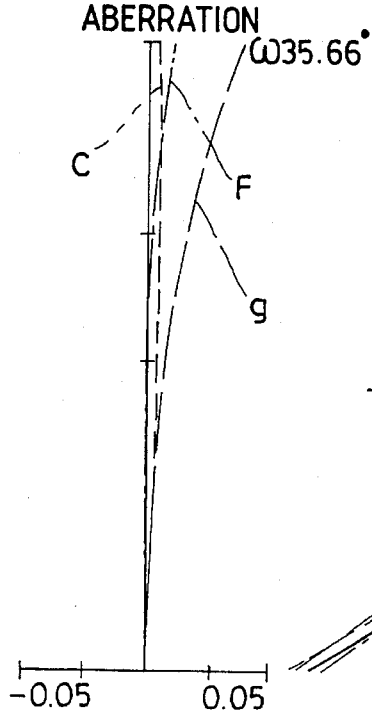
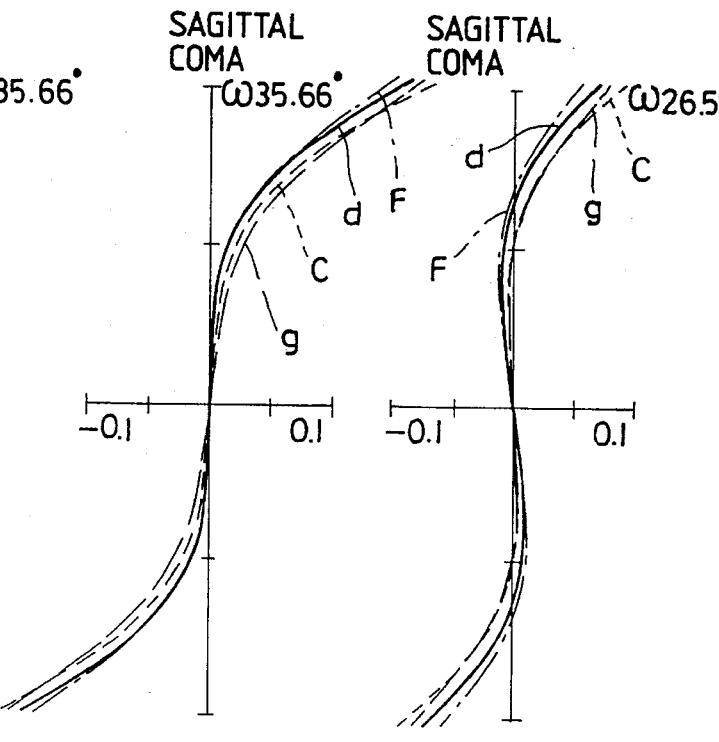
FIG. 14A SPHERICAL ABERRATION
FIG. 14B ASTIGMATISM
FIG. 14C DISTORTION
FIG. 14D LATERAL CHROMATIC ABERRATION
FIG. 14E SAGITTAL COMA
FIG. 14F SAGITTAL COMA

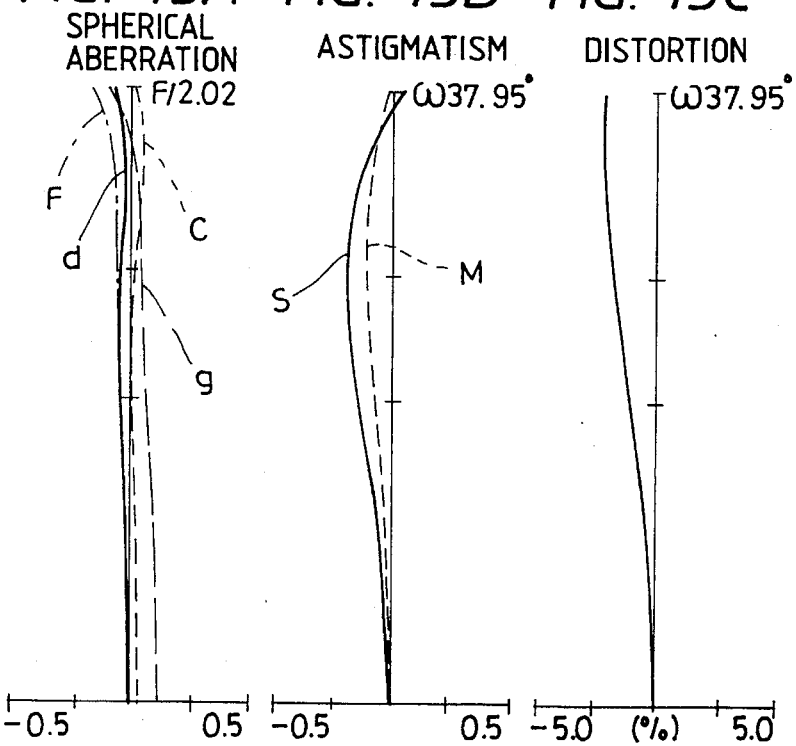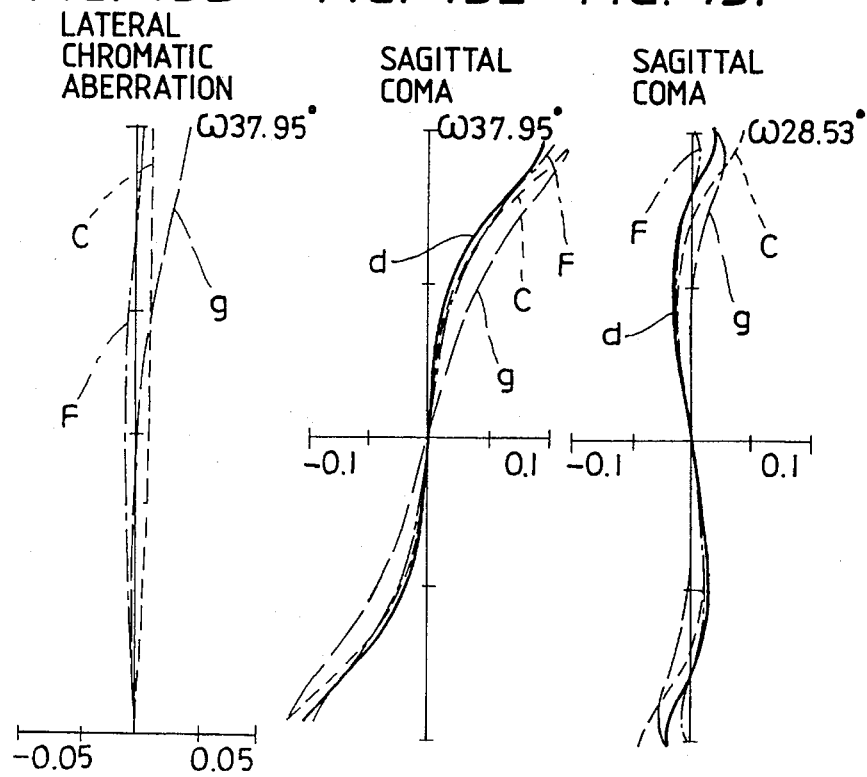

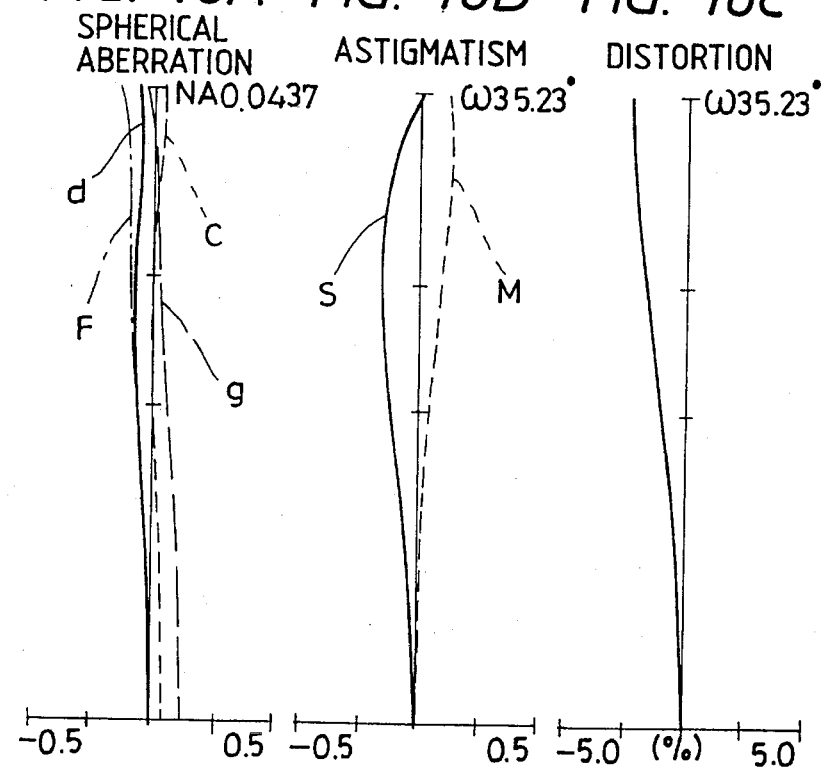
FIG. 16A SPHERICAL ABERRATION
FIG. 16B ASTIGMATISM
FIG. 16C DISTORTION
FIG. 16D LATERAL CHROMATIC ABERRATION
FIG. 16E SAGITTAL COMA
FIG. 16F SAGITTAL COMA

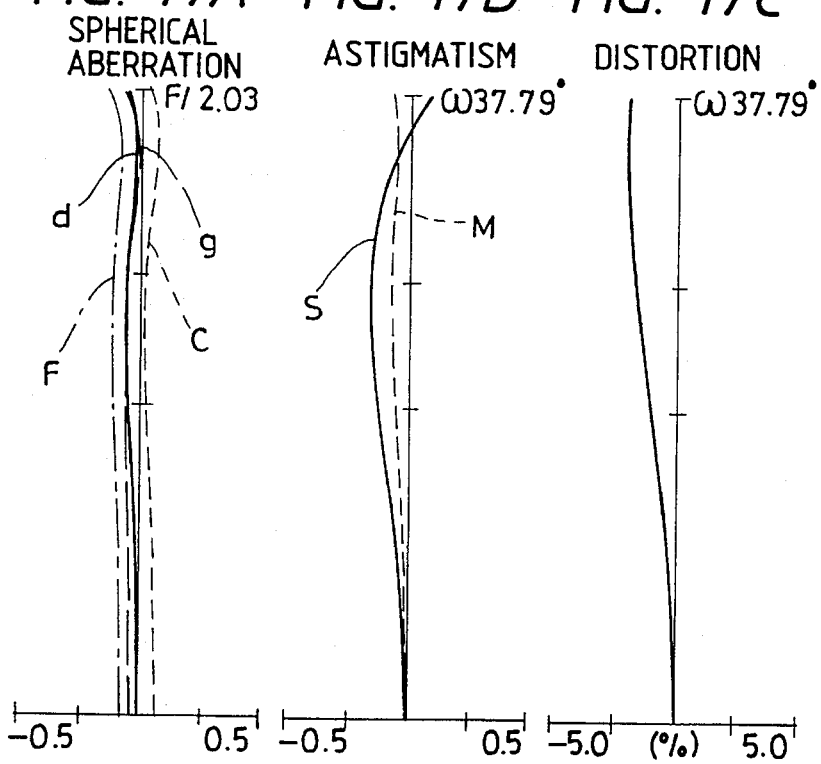

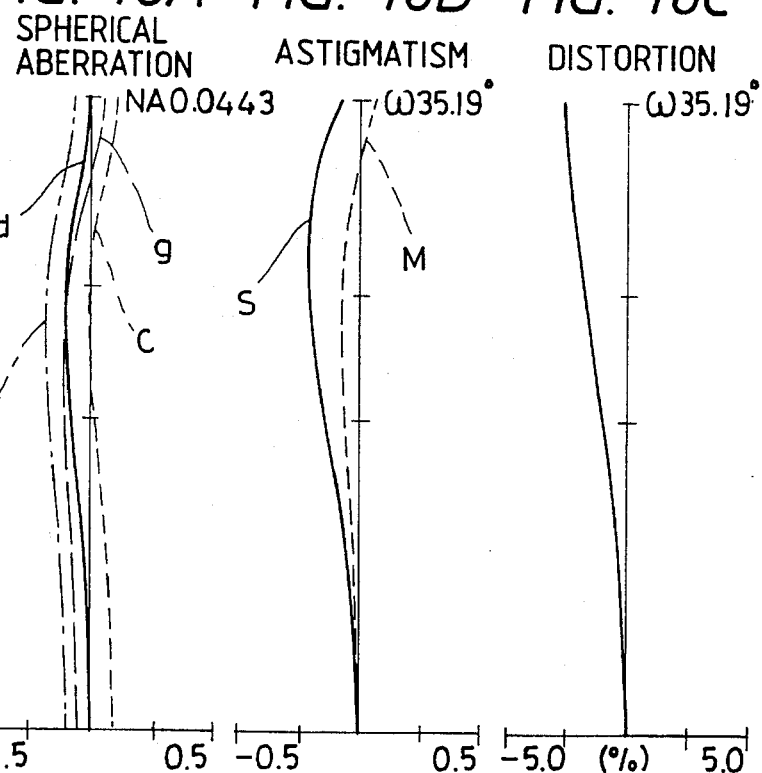
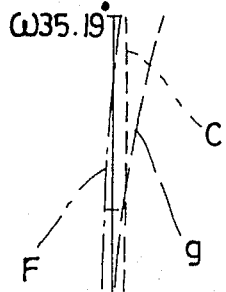
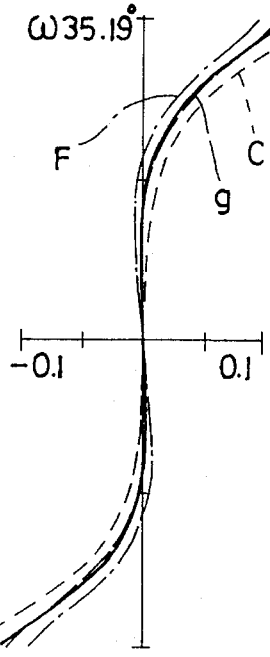
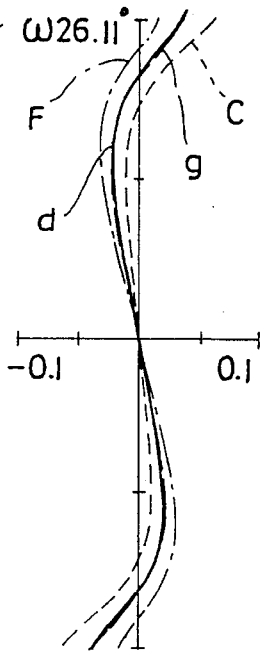

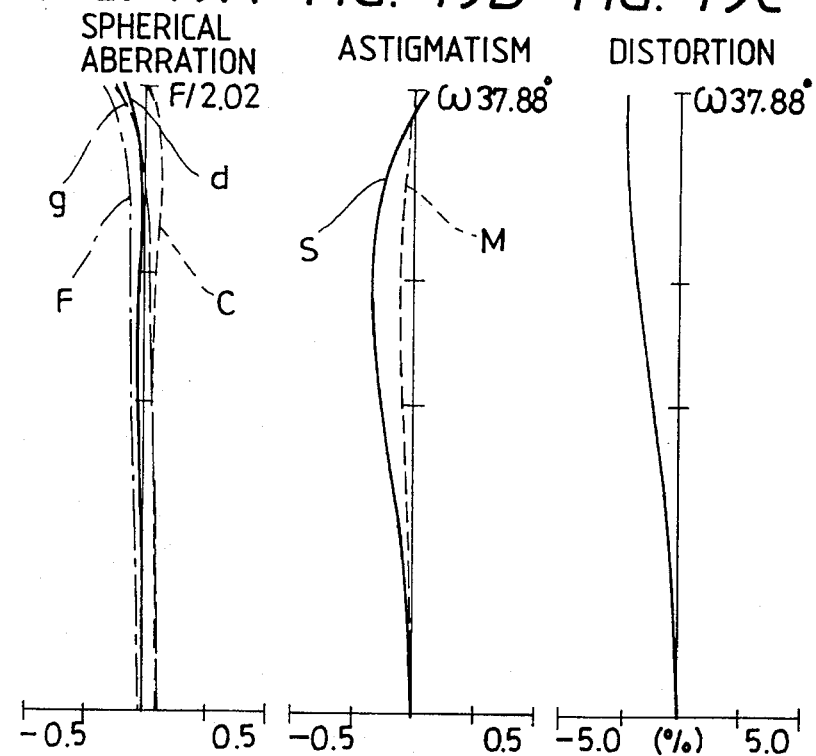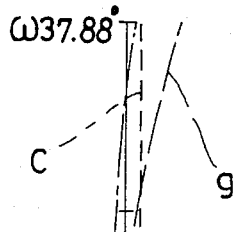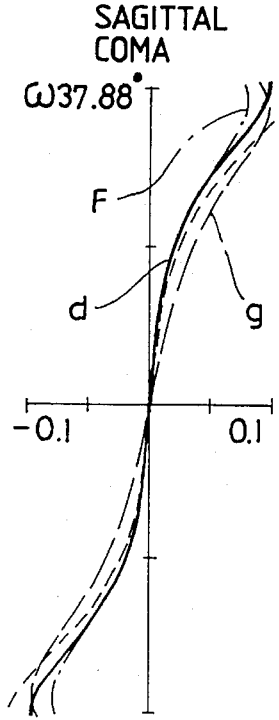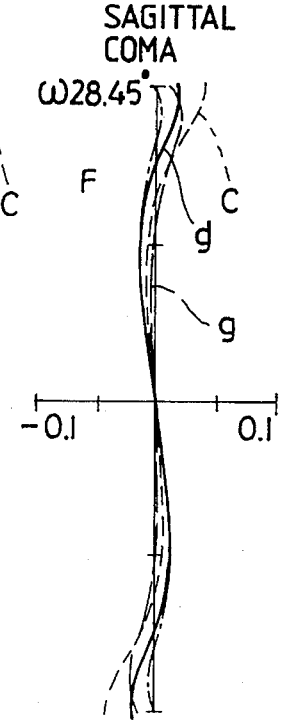

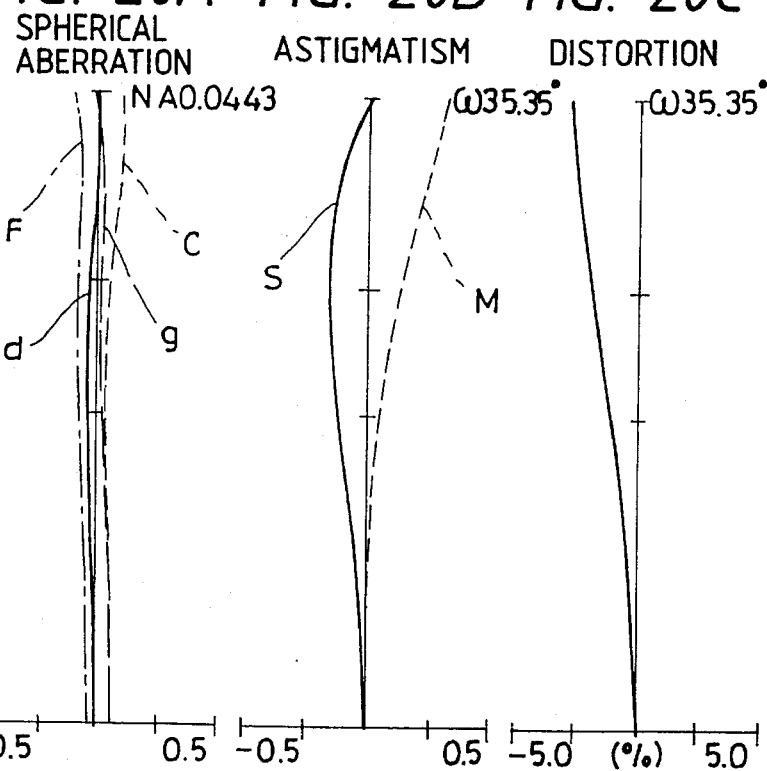
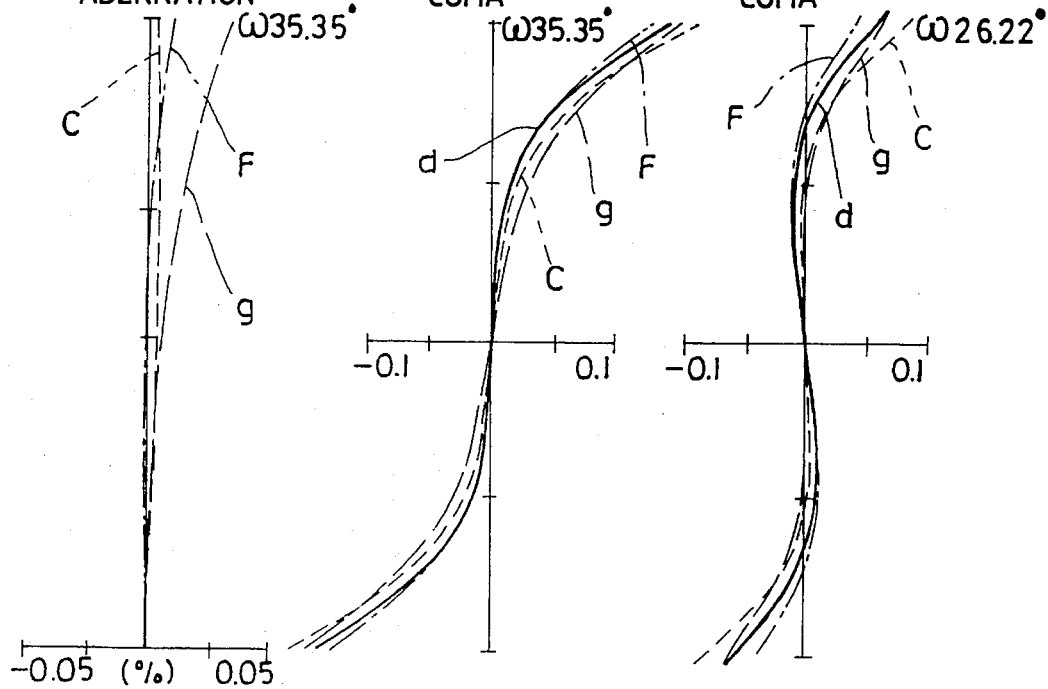

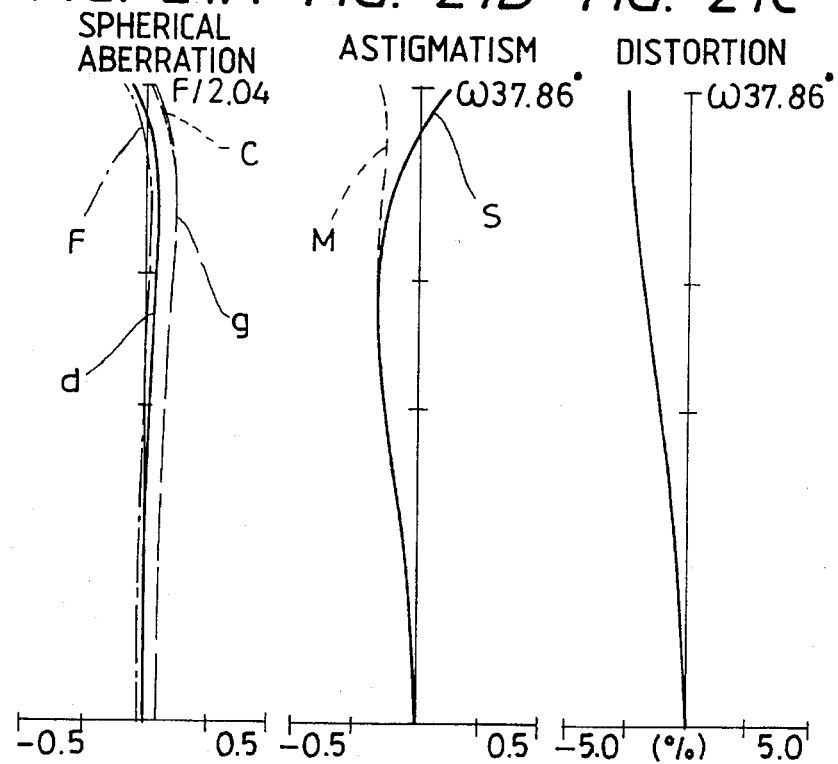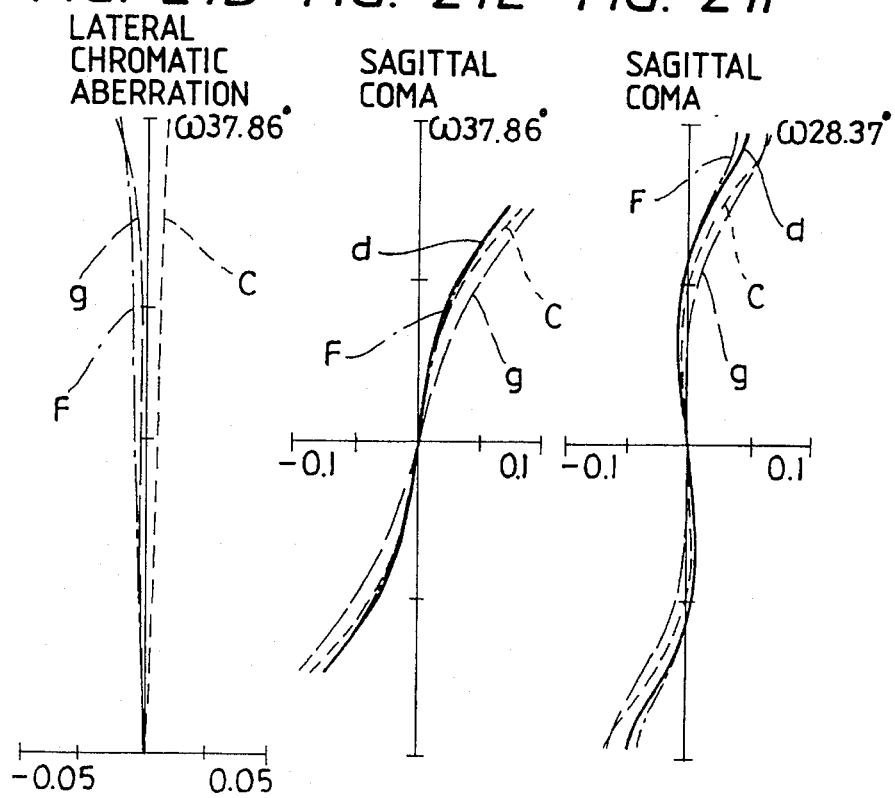

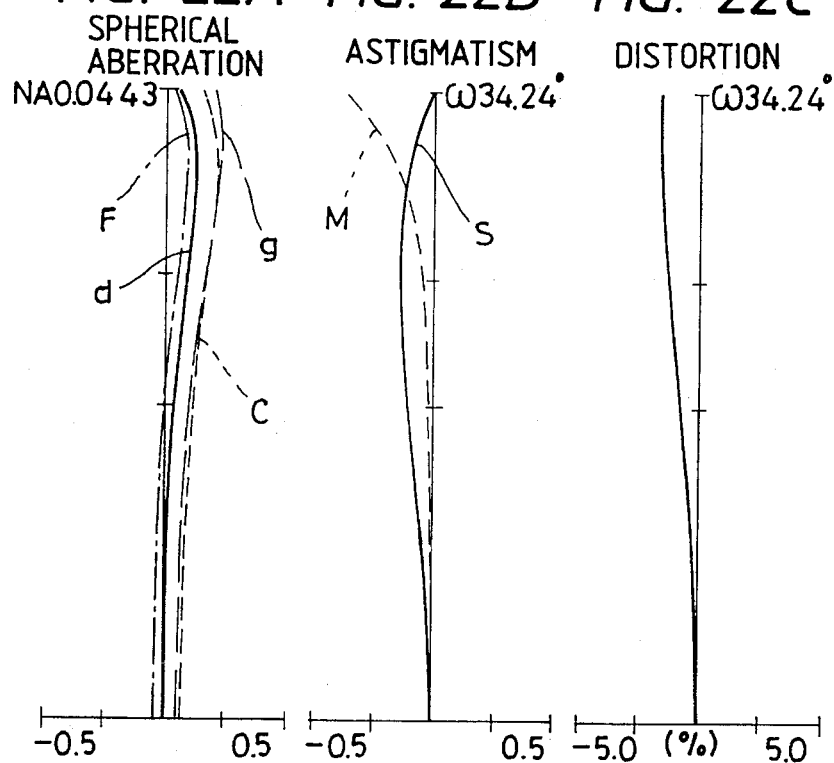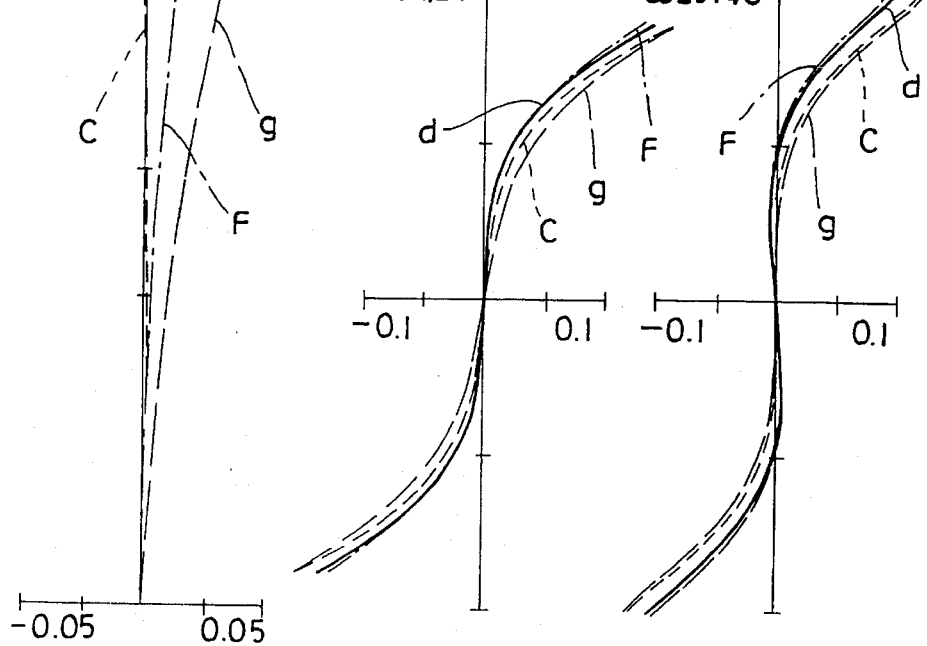

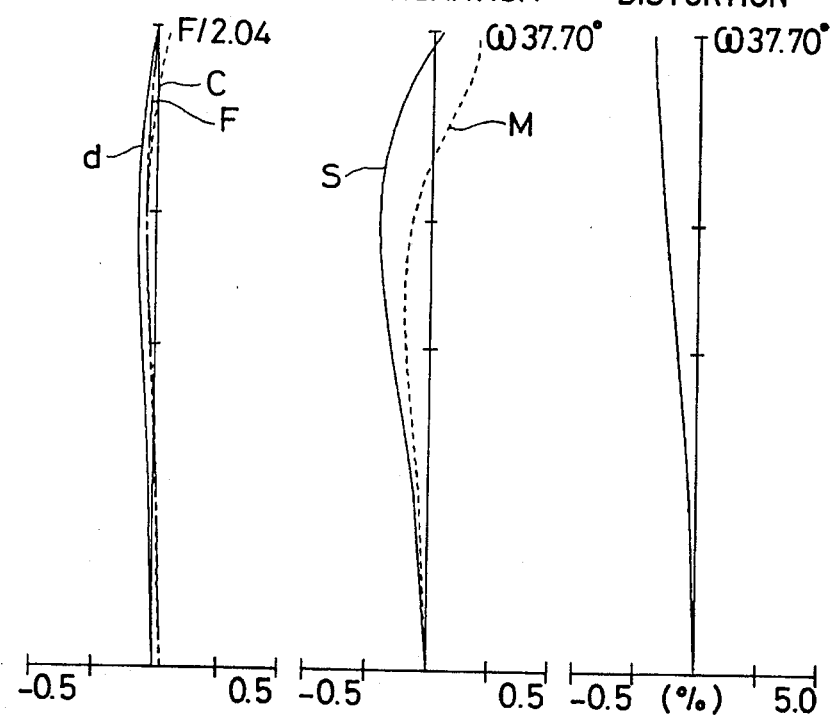
FIG. 23A SPHERICAL ABERRATION
FIG. 23B ASTIGMATISM
FIG. 23C DISTORTION
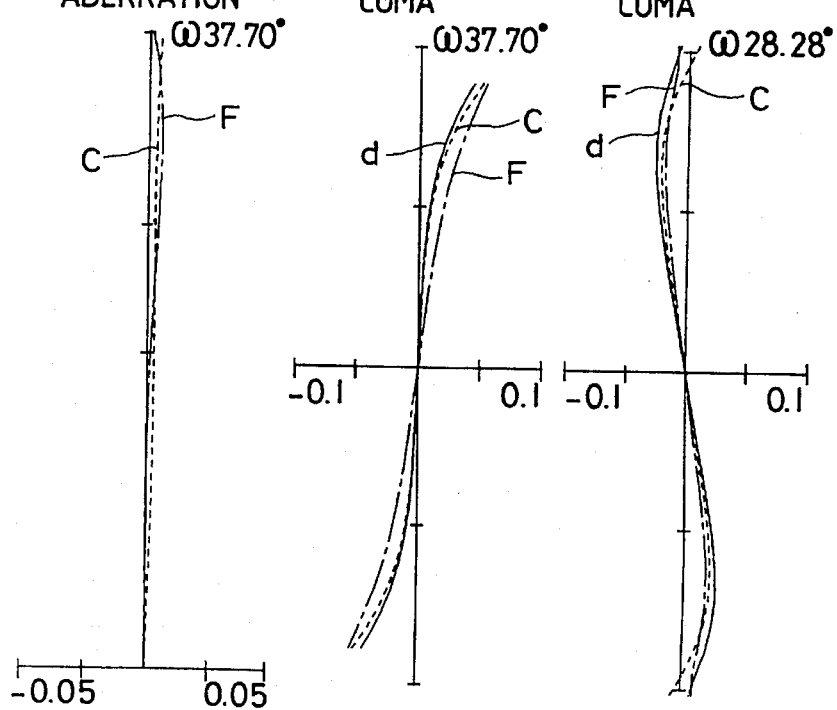
FIG. 23D LATERAL CHROMATIC ABERRATION
FIG. 23E SAGITTAL COMA
FIG. 23F SAGITTAL COMA

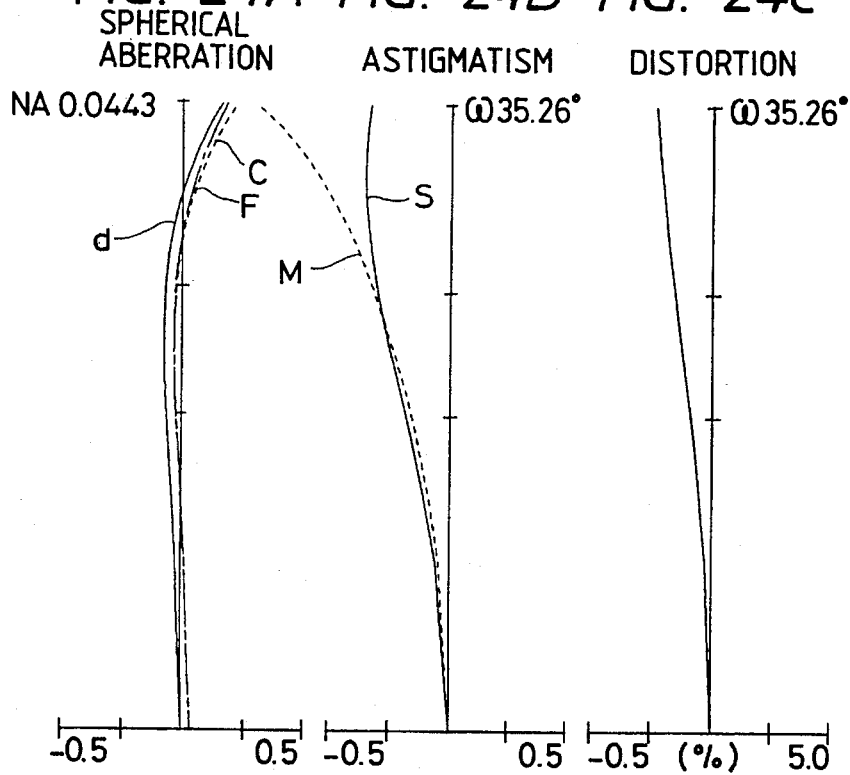
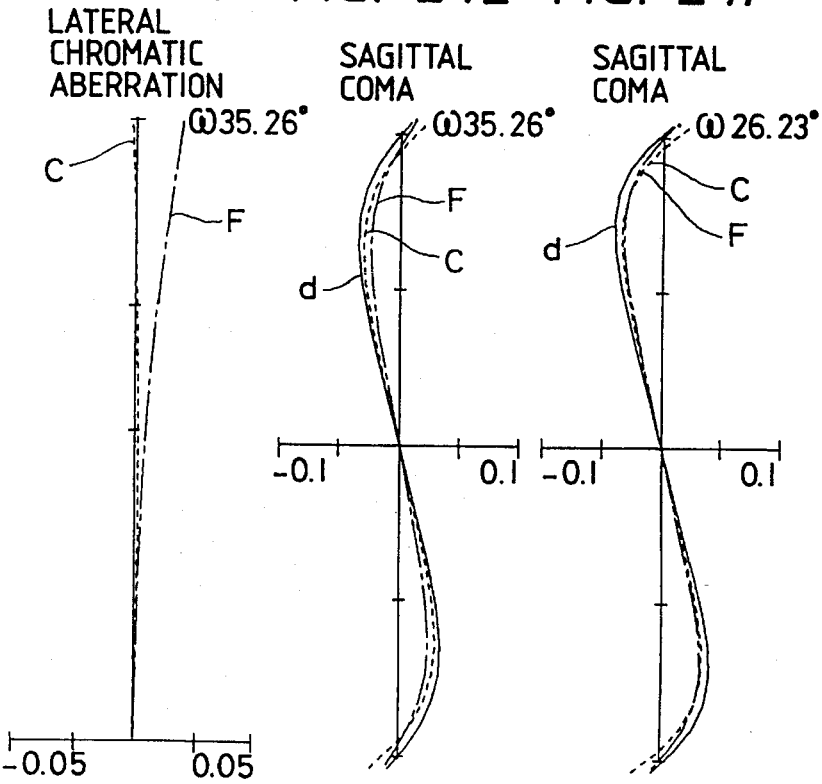

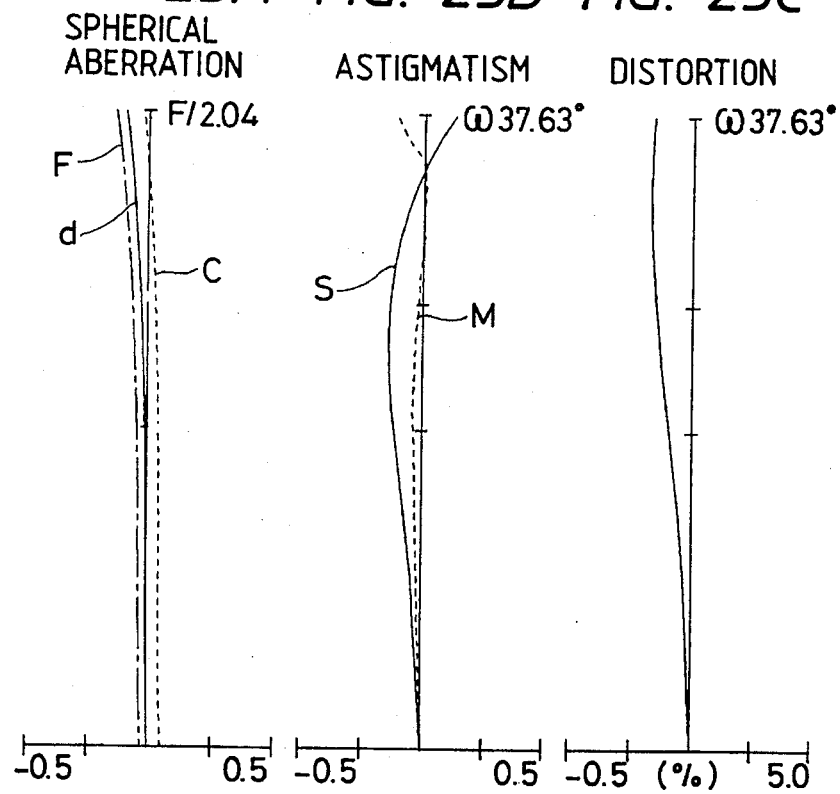
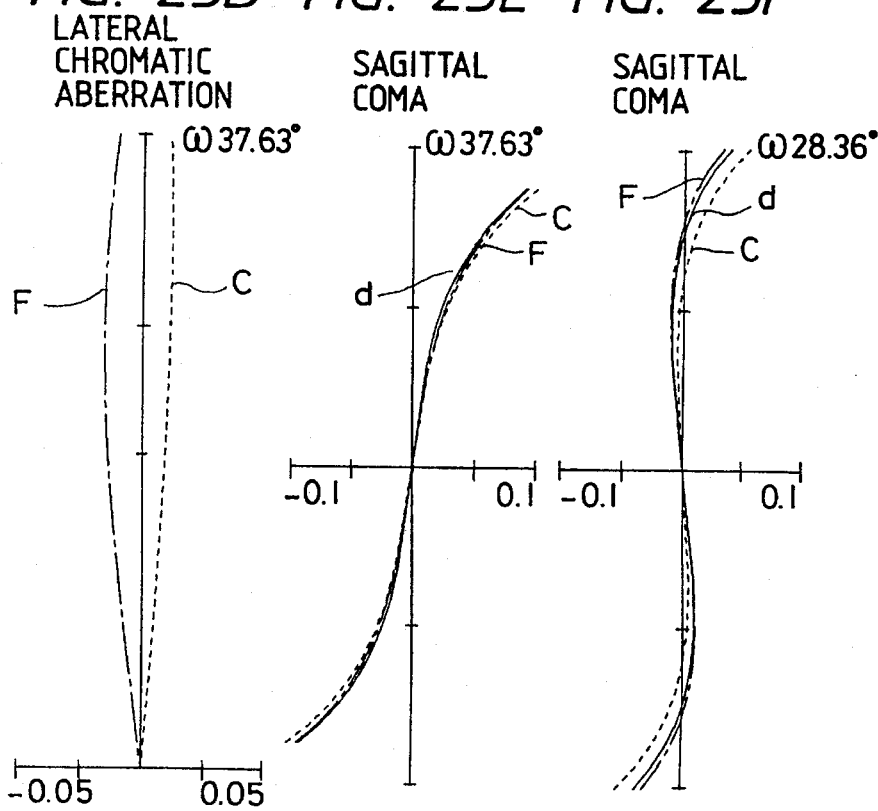

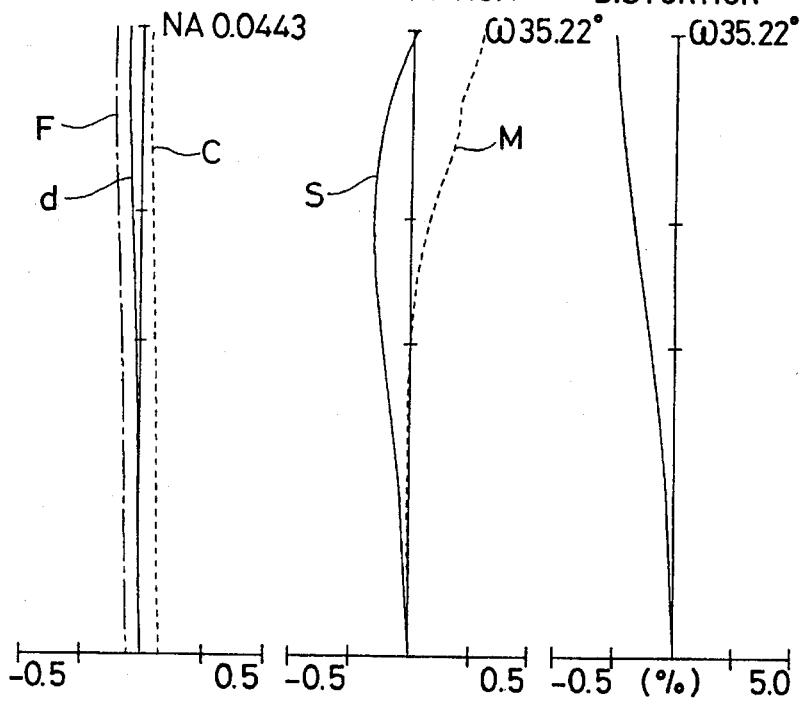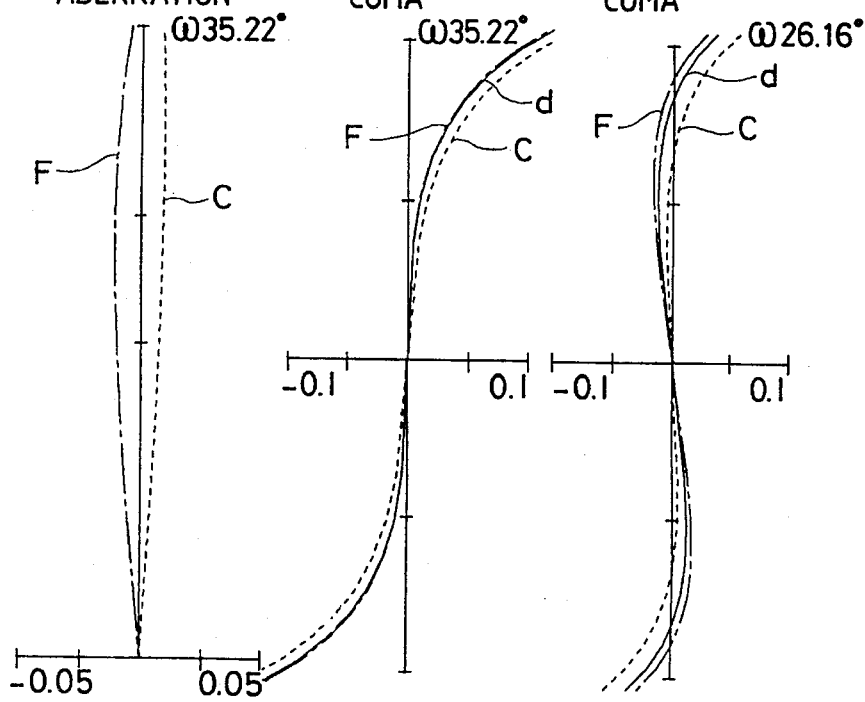

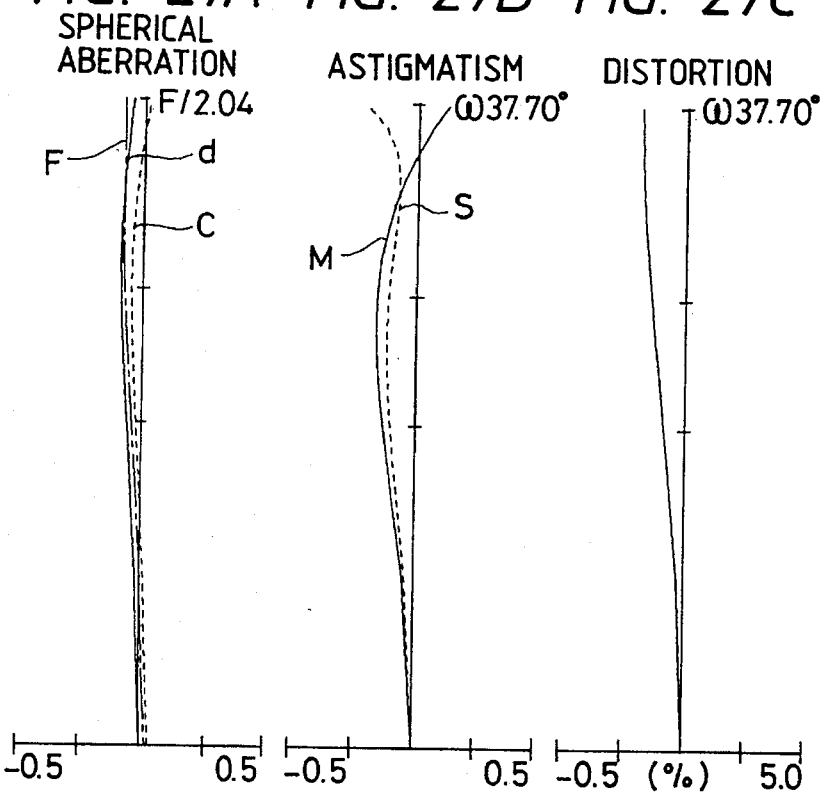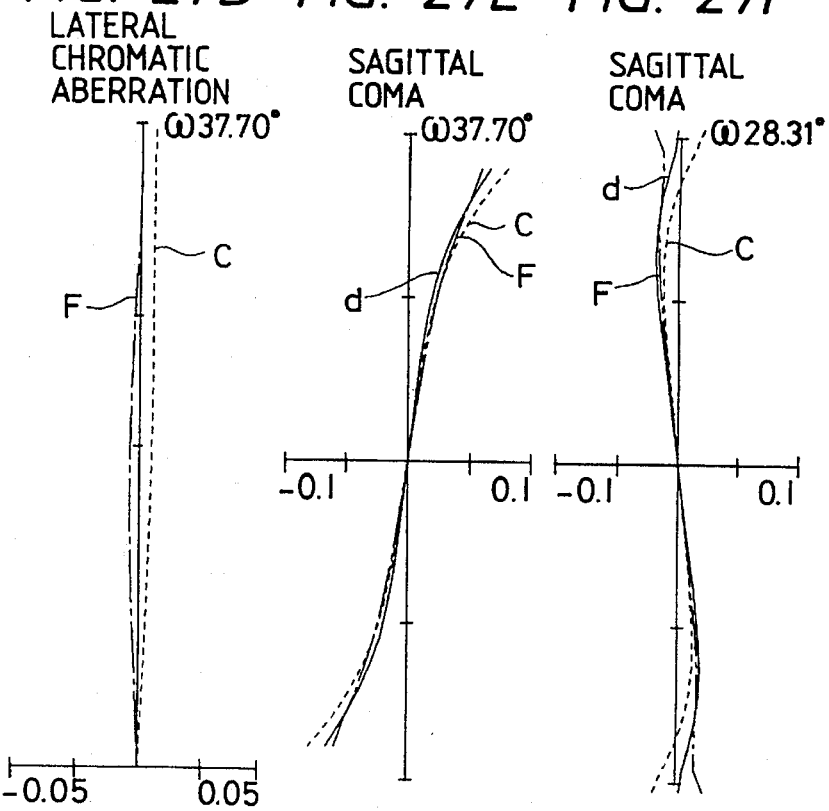

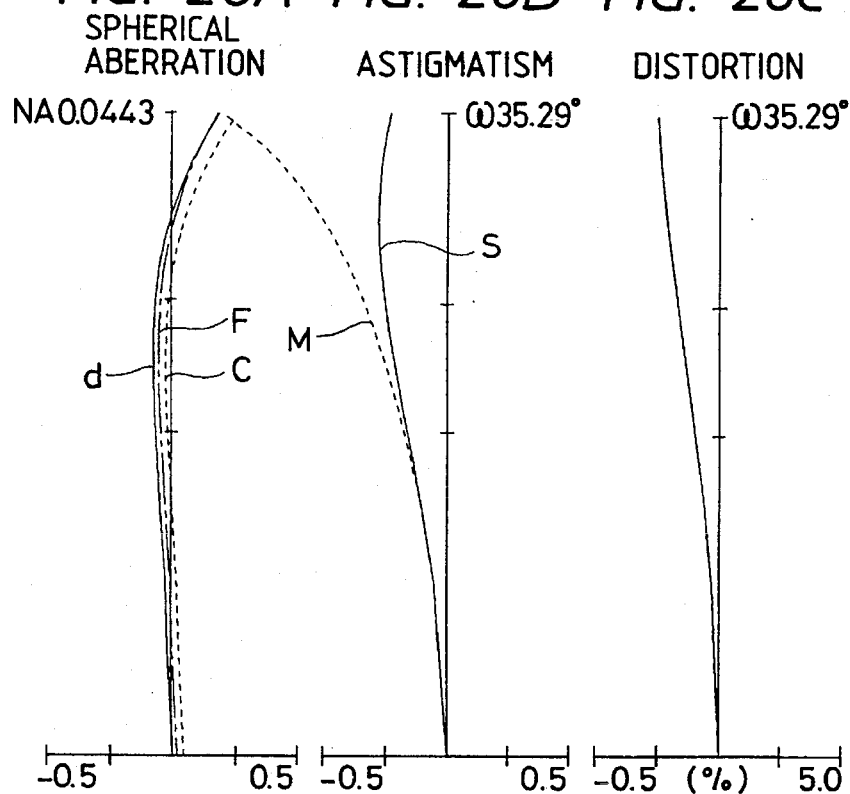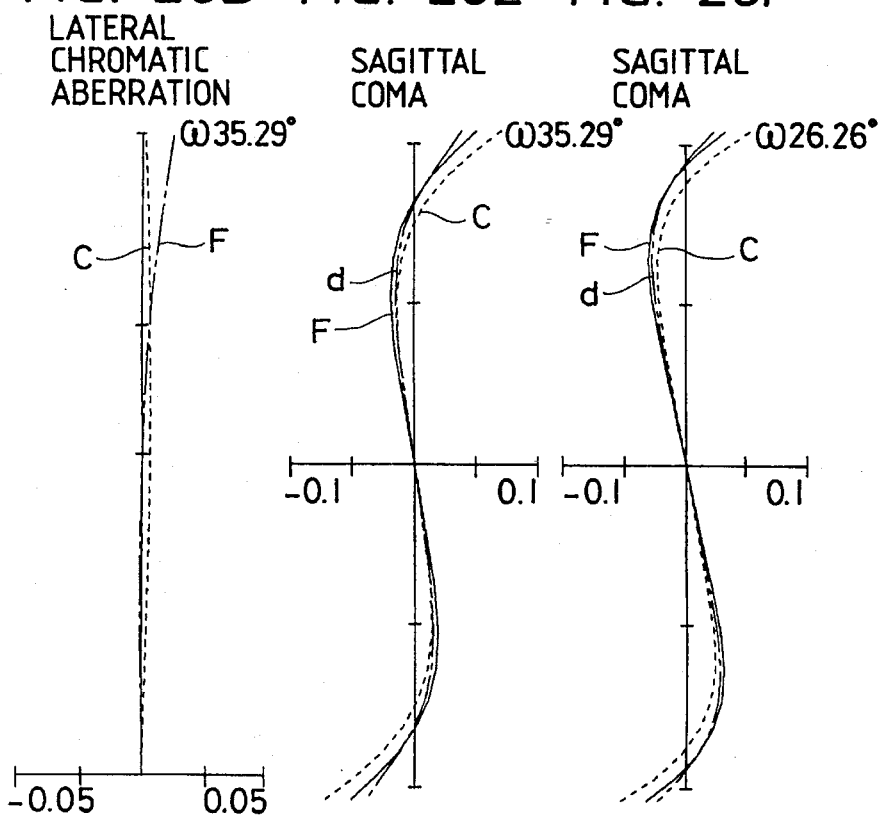

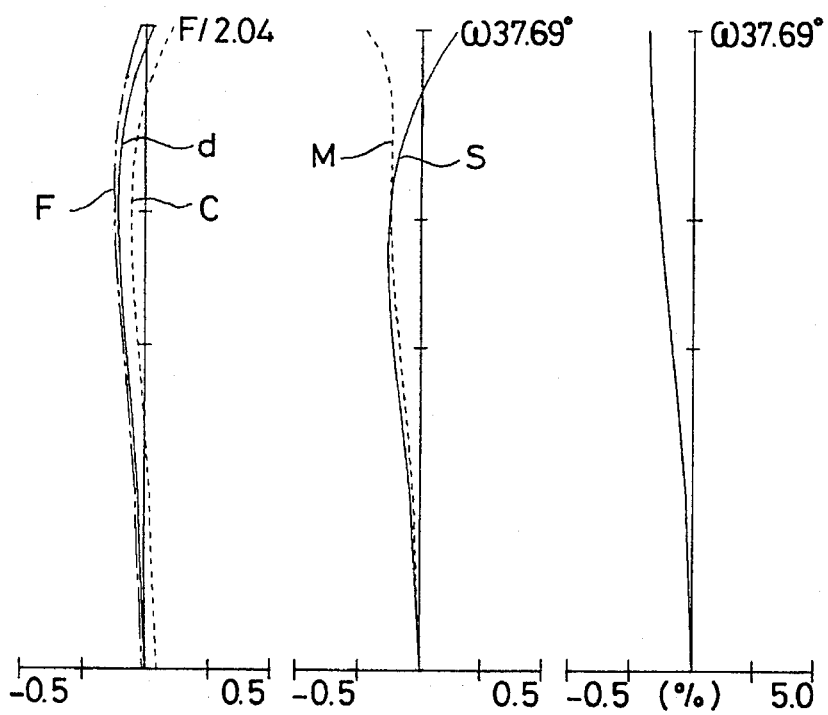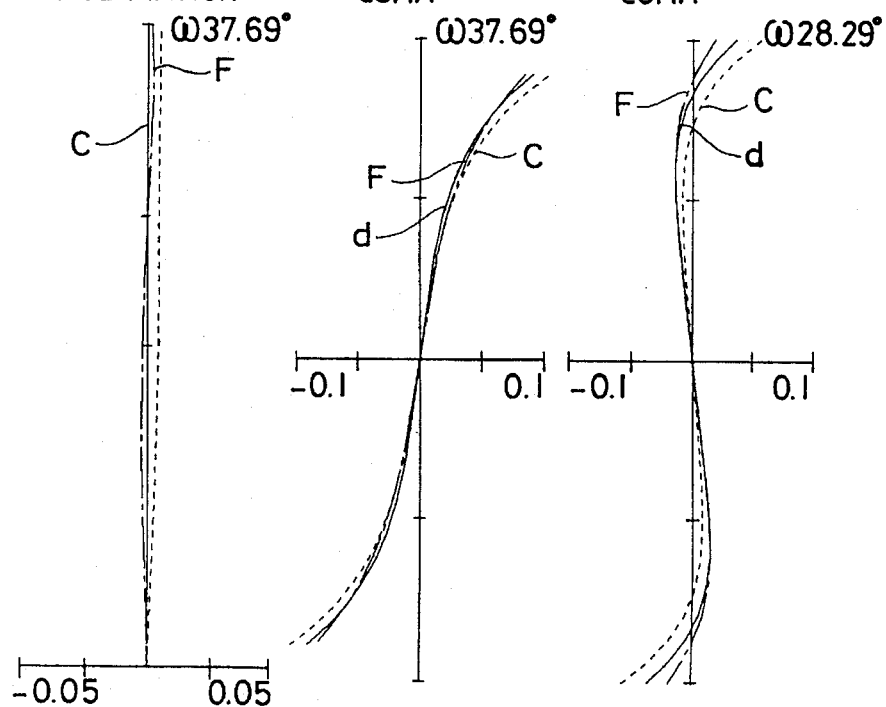

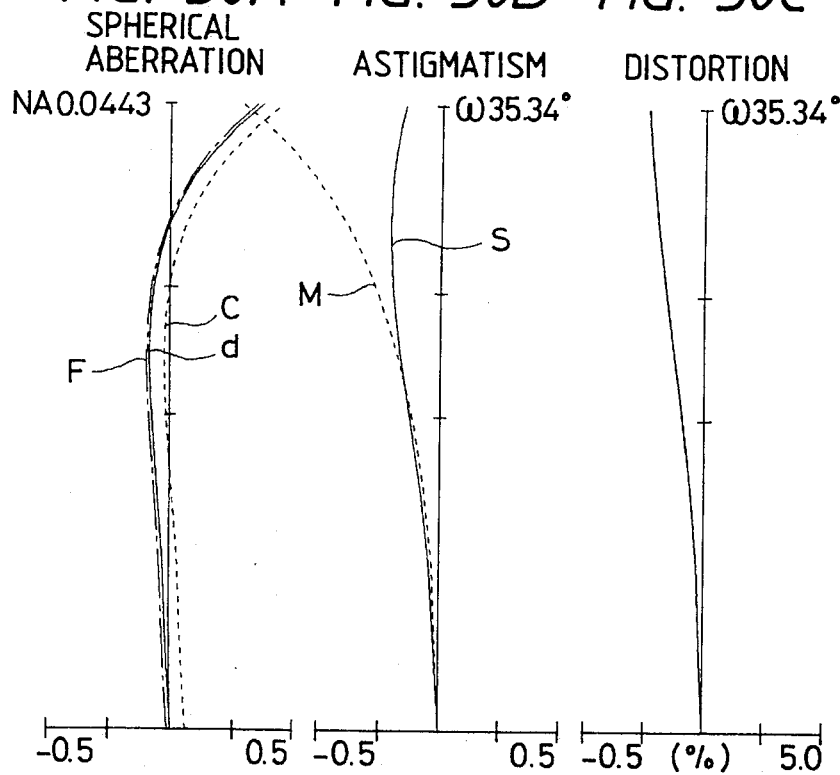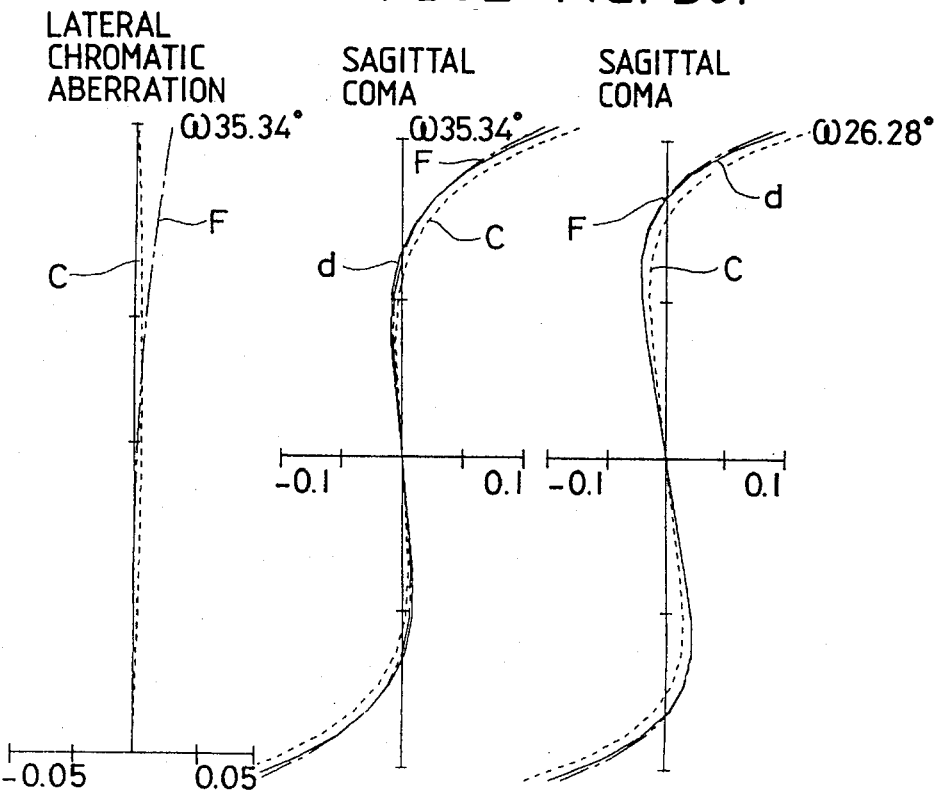

WIDE-ANGLE LENS SYSTEM #6

BACKGROUND OF THE INVENTION

1. Field of the Invention

The present invention relates to a retrofocus type bright and wide-angle lens system which has a photographing field angle of at least 75° and an F number on the order of 2.

2. Description of the Prior Art

Along with the recent progresses made in lens design, shaping and manufacturing, zoom lens systems are being adopted even for most single-lens reflex cameras which are expected to form images of high qualities. However, it is difficult to correct aberrations sufficiently favorably within vari-focal ranges of bright zoom lens systems which have small F numbers and it cannot be said that aberrations are corrected in such zoom lens systems so sufficiently as those in lens systems having fixed focal lengths. Therefore, attempts are being made to configure lens systems having fixed focal lengths so as to have large apertures and form images of higher qualities than those available with zoom lens systems.

High optical performance is desired, in particular, for lens systems which have photographing field angles of at least approximately 75° and F numbers on the order of 2 since these lens systems are used most frequently in practice. When these lens systems are to be used with single-lens reflex cameras which inevitably comprise mirrors, however, it is obliged to select the retrofocus type for the lens systems. Since the retrofocus type lens systems have compositions which are asymmetrical with regard to stops, correction of negative distortion in particular poses a problem. Further problems are posed by correction of curvature of field when the lens systems are to have larger field angles and by correction of sagittal coma when the lens systems are to be brighter or have smaller F numbers.

As conventional wide-angle lens systems which are proposed for solving these problems, there are known the lens systems disclosed by Japanese Patents Kokai Publication No. Sho 47-41,626, Kokai Publication No. Sho 48-43,627, Kokai Publication No. Sho 50-87,643, Kokai Publication No. Sho 51-58332 and Kokai Publication No. Sho 61-10, 045. Each of these lens systems consists of a front unit comprising a lens unit which consists of a plurality of lens components including at least one positive lens component disposed on the object side and has a negative refractive power as a whole, a stop, and a rear unit which comprises at least one negative lens component and two positive lens components disposed on the image side of the stop. It cannot be said that sagittal coma is corrected sufficiently in these lens systems and they have large sizes.

Further, known as other conventional examples are the lens systems disclosed by Japanese Patents Kokai Publication No. Sho 61-144,616, Kokoku Publication No. Sho 49-20,215, Kokoku Publication No. Sho 55-10,049, Kokoku Publication No. Sho 58-22,724 and Kokoku Publication No. Sho 60-40,009. Each of lens systems consists of a front unit comprising a lens unit which is composed of a plurality of lens components including at least one positive lens component and has a negative refractive power as a whole, a stop, and a rear unit which comprises at least one negative lens component and two positive lens components disposed on the image side of the stop; the rear unit using at least one aspherical surface. However, it cannot be said that negative distortion, curvature of field and sagittal coma are sufficiently corrected at the same time in these lens systems.

Furthermore, aberrations are varied remarkably by focusing the above-mentioned conventional examples onto objects located at short distances.

In addition, the lens system disclosed by Japanese Patent Kokoku Publication No. Sho 54-25,810 is known as a conventional example which adopts the floating moving mode for reducing the variations of aberrations to be caused by focusing the lens system onto an object located at a short distance. This conventional example is capable of reducing the variations of aberrations relatively favorably which are to be caused by focusing the lens system, but allows curvature of sagittal image surface and remarkable production of sagittal coma in particular. Therefore, it cannot be said that aberrations are corrected sufficiently in this lens system.

SUMMARY OF THE INVENTION

A primary object of the present invention is to provide a retrofocus type bright wide-angle lens system having aberrations, in particular negative distortion, curvature of field and sagittal coma, which are corrected sufficiently favorably at the same time.

The wide-angle lens system according to the present invention consists of a front unit, a stop and a rear unit which are disposed in order from the object side. The front unit comprises, in order from the object side, a first lens unit which comprises a plurality of lens components including a positive lens component and has a negative refractive power as a whole (represented by a reference symbol $G_1$ in drawings illustrating embodiments of the present invention to be described later), a negative lens component having a concave air-contact surface on the object side and an air-contact surface on the image side, and a cemented lens component; and a rear unit which comprises a negative lens component disposed on the side of the stop and at least two positive lens components disposed on the image side of the negative lens component.

A lens system of the retrofocus type such as that according to the present invention adopts a refractive power distribution which is asymmetrical with regard to a stop for obtaining a back focal length longer than a focal length of the lens system as a whole. For this reason, remarkable negative distortion in particular is produced when an attempt is made to shorten a total length of the lens system while reserving the required back focal length. Further, when a field angle of the lens system is widened, angles and heights of incidence of principal rays incident on the lens unit which is disposed on the object side and has the strong negative refractive power are largely different dependently on differences in image height, and aberrations of high orders are produced, thereby remarkably curving a sagittal image surface. Moreover, when the lens system is to be configured so as to be bright, the concave surface disposed in the vicinity of the stop must have a strong refractive power for correcting spherical aberration to such a degree as to produce remarkable sagittal coma, thereby constituting a cause for production of coma flare.

Owing to the composition described above, the lens system according to the present invention is capable of favorably correcting aberrations, in particular negative distortion, curvature of field, remarkable curvature of the sagittal image surface and sagittal coma. Speaking more concretely, the lens components disposed on the object side in the front unit serve for suppressing production of negative distortion, and the first lens unit which is composed of the plurality of lens components including at least one positive lens component disposed on the object side in the front unit and has the negative refractive power functions to obtain the strong negative refractive power while correcting chromatic aberration. Further, negative distortion produced by the first lens unit can be corrected by disposing a relatively thick positive lens component between the first lens unit and the stop. However, such a positive lens component produces remarkable chromatic aberration. Therefore, chromatic aberration is corrected in the lens system according to the present invention by configuring this positive lens component as a cemented lens component which comprises at least one cemented surface formed between a negative lens element and a positive lens element, and has a positive refractive power as a whole. Further, the first lens unit should preferably be composed of at least two negative lens components and at least one positive lens component, and it is effective to configure the lens component to be disposed on the image side in the first lens unit as a negative lens component having a concave surface on the image side for correcting spherical aberration, sagittal coma and distortion in the lens system as a whole according to the present invention.

Furthermore, it is desirable to dispose, in the rear unit, at least one negative lens component on the image side of the stop and in the vicinity of the stop so as to produce positive spherical aberration for correcting negative spherical aberration in the lens system as a whole while maintaining small influences on offaxial aberrations, and two positive lens components on the image side of the negative lens component as described above for imparting a relatively strong refractive power to the rear unit and correcting chromatic aberration. One of these two positive lens components may be cemented to a negative lens component.

In a lens system which has a small F number or is bright, it is general to select a high curvature for an object side concave surface of a rear unit so as to produce remarkable positive spherical aberration for correcting remarkable negative spherical aberration in the lens system as a whole. As a result, this surface having the high curvature produces sagittal coma in too large an amount, thereby making it impossible to correct spherical aberration and sagittal coma at the same time.

In the lens system according to the present invention, spherical aberration and sagittal coma are corrected at the same time by using at least one lens component which has a concave surface on the object side and air-contact surfaces on both the sides at a location between the first lens unit disposed on the object side and the cemented lens component disposed in the front unit so that the negative lens component will share the function to correct spherical aberration, and a low curvature is selected for the object side concave surface of the rear unit for correcting sagittal coma produced by this concave surface.

By adopting the composition described above, the present invention has succeeded in providing a lens system which has aberrations corrected sufficiently favorably.

In addition, the lens system according to the present invention can have improved optical performance when it uses an aspherical surface.

When an aspherical surface is to be used in the front unit, aberrations can be corrected favorably in the lens system as a whole by selecting an aspherical surface having such a shape as to have positive refractive power which is strengthened as portions of the aspherical surface are further from an optical axis so that the aspherical surface is capable of producing positive distortion for correcting the negative distortion produced remarkably by the front unit. When an aspherical surface is to be used in the rear unit, spherical aberration can be corrected favorably in the lens system as a whole by selecting an aspherical surface having such a shape as to have a positive refractive power which is weakened as portions of the aspherical surface are further from the optical axis so that the aspherical surface is capable of producing positive spherical aberration for correcting the negative spherical aberration produced remarkably by the rear unit. As a result, the spherical aberration correcting functions of the other lens surfaces, in particular that of the object side concave surface of the rear unit, can be lessened by using such an aspherical surface. Since sagittal coma to be produced by this concave surface is reduced by lowering curvature on this surface, it is possible to correct spherical aberration and sagittal coma at the same time.

In the lens system according to the present invention, aberrations can be corrected more favorably by configuring the lens system so as to satisfy at least any one of the conditions (1) through (6) which are listed below:

$$-2.0 < f/f_1 < -0.2 \quad (1)$$

$$0.2 < f/f_R < 1.0 \quad (2)$$

$$-1.0 < (R_F + R_R)/(R_F - R_R) < 0 \quad (3)$$

$$0 < (R_{FS} + R_{RS})/(R_{FS} - R_{RS}) < 1.0 \quad (4)$$

$$0.1 < D_C/f < 1.0 \quad (5)$$

$$1.0 \times 10^{-5} < |\Delta x|/f < 1.0 \times 10^{-1} \quad (6)$$

wherein the reference symbol f represents a total focal length of the lens system as a whole when it is focused on an object located at infinite distance, the reference symbol $f_1$ designates a total focal length of the first lens unit when the lens system is focused on the object located at infinite distance, the reference symbol $f_R$ denotes a total focal length of the rear unit when the lens system is focused on the object located at infinite distance, the reference symbols $R_F$ and $R_R$ represent radii of curvature on an object side surface and an image side surface respectively of an air lens formed between: an image side surface of the negative lens component which is comprised in the first lens unit and an object side surface of the negative lens component arranged on the object side of the cemented lens component in the front unit, the reference symbols $R_{FS}$ and $R_{RS}$ designate radii of curvature on surfaces which are closest to the stop on the object side and the image side respectively, the reference symbol $D_C$ denotes thickness, as measured on the optical axis, of the cemented lens component as a whole which is disposed in the front unit and has at least one cemented surface, and the reference symbol $\Delta x$ represents a departure from a reference sphere of any one of aspherical surfaces used in the rear unit as measured at a height at which a marginal ray coming from an infinite object point crosses through the aspherical surface.

The condition (1) defines the total focal length of the first lens unit disposed on the object side in the front unit. If the lower limit of −2.0 of the condition (1) is exceeded, the first lens unit $G_1$ will have too strong a negative refractive power and produce aberrations, negative distortion in particular, in too large amounts for favorable correction. If the upper limit of −0.2 of the condition (1) is exceeded, in contrast, the first lens unit $G_1$ will have too weak a refractive power, whereby the lens system will undesirably be enlarged.

The condition (2) defines the total focal length of the rear unit. If the lower limit of 0.2 of the condition (2) is exceeded, the rear unit will have too weak a refractive power, whereby the lens system will undesirably be enlarged. If the upper limit of 1.0 of the condition (2) is exceeded, the rear unit will produce aberrations, negative distortion and negative spherical aberration in particular, in too large amounts for favorable correction.

The conditions (3) and (4) are required for favorably correcting spherical aberration and sagittal coma at the same time in the lens system. If the upper limit of −1.0 of the condition (4) or 0 of the condition (3) is exceeded, spherical aberration will be unbalanced with sagittal coma, thereby making it difficult to correct these aberrations at the same time in the lens system.

The condition (5) defines thickness of the positive cemented lens component having at least one cemented surface which is disposed in the front unit. If the lower limit of 0.1 of the condition (5) is exceeded, it will be hard to correct negative distortion and astigmatism produced by the negative lens component disposed on the object side in the front unit. If the upper limit of 1.0 of the condition (5) is exceeded, the positive cemented lens component disposed in the front unit will produce remarkable negative spherical aberration in an amount too large for favorable correction.

The condition (6) defines a departure from a reference sphere of one of the aspherical surfaces used in the rear unit. If the lower limit of $1.0 \times 10^{-5}$ of the condition (6) is exceeded, the departure from the reference sphere will be too small, thereby lowering the effects for correcting aberrations. If the upper limit of $1.0 \times 10^{-1}$ of the condition (6) is exceeded, the departure from the reference sphere will be large enough for enhancing the effects for correcting aberrations, but the aspherical surface must be manufactured with higher precision or less eccentricity, thereby undesirably increasing manufacturing cost thereof.

The wide-angle lens system according to the present invention consists, in order from the object side, of the front unit, the stop and the rear unit as described above; the front unit comprising the first lens unit having the negative refractive power as a whole, the concave lens component having the concave surface on the object side and the cemented lens component; whereas the rear unit comprising the negative lens component and at least the two positive lens components. The wide-angle lens system according to the present invention uses aspherical surfaces for favorably correcting sagittal coma and spherical aberration in particular. However, graded refractive index lens components which have refractive index gradients in the direction along the optical axis may be used in place of the aspherical surfaces for correcting aberrations more favorably.

A graded refractive index lens component which has a refractive index gradient in the direction of an optical axis expressed by the formula shown below has an aberration correcting capability equivalent to that of an aspherical surface:

$$N(x) = N_0 + N_1 x + N_2 x^2 + N_3 x^3 + \ldots$$

wherein the reference symbol $N_0$ represents a refractive index on a standard plane, the reference symbol $x$ designates a distance as measured from the standard plane in the direction of the optical axis, the reference symbols $N_1, N_2, N_3, \ldots$ denote refractive index distribution coefficients of the first, second, third, ... orders at a standard wavelength, and the reference symbol $N(x)$ represents a refractive index at the distance $x$. The standard plane means a plane which is perpendicular to the optical axis at an optional point on the optical axis within the graded refractive index lens component.

The wide-angle lens system according to the present invention is capable of correcting aberrations, in the same manner as with aspherical surfaces, by using graded refractive index lens components having refractive index gradients in the direction of the optical axis in the rear unit disposed on the image side of the stop.

Further, it is desirable that the graded refractive index lens components satisfy the following condition (7):

$$-1 < 1/(R \times N_1) < 0 \qquad (7)$$

wherein the reference symbol R represents a radius of curvature on a surface having a refractive index distribution when a medium is homogenous from an optional point on the optical axis in the graded refractive index lens component to a surface on one side an refractive index distribution is imparted from the point to a surface on the other side or a radius of curvature whichever is the smaller out of those on the surfaces on both the sides when a refractive index distribution is imparted over the entire range from one surface to the other.

If the upper limit or the lower limit of the condition (7) is exceeded, aberrations will be unbalanced, thereby making it difficult to correct aberrations, in particular spherical aberration and sagittal coma.

In order to reduce variations of aberrations which are to be caused by focusing the wide-angle lens system according to the present invention onto an object located at a short distance, it is effective to configure the lens system so that at least one of airspaces reserved therein is varied for focusing.

BRIEF DESCRIPTION OF THE DRAWINGS

FIG. 11A, FIG. 11B, FIG. 11C, FIG. 11D, FIG. 11E and FIG. 11F show graphs visualizing aberration characteristics of the first embodiment of the present invention when it is focused on an object located at an infinite distance;

FIG. 12A, FIG. 12B, FIG. 12C, FIG. 12D, FIG. 12E and FIG. 12F show graphs visualizing aberration characteristics of the first embodiment of the present invention when it is focused on an object located at an extremely short distance;

FIG. 13A, FIG. 13B, FIG. 13C, FIG. 13D, FIG. 13E and FIG. 13F show graphs visualizing aberration characteristics of the second embodiment of the present invention when it is focused on the object located at the infinite distance;

FIG. 14A, FIG. 14B, FIG. 14C, FIG. 14D, FIG. 14E and FIG. 14F show graphs visualizing aberration characteristics of the second embodiment of the present invention when it is focused on the object located at the extremely short distance;

FIG. 15A, FIG. 15B, FIG. 15C, FIG. 15D, FIG. 15E and FIG. 15F show curves illustrating aberration characteristics of the third embodiment of the present invention when it is focused on the object located at the infinite distance;

FIG. 16A, FIG. 16B, FIG. 16C, FIG. 16D, FIG. 16E and FIG. 16F show curves illustrating aberration characteristics of the third embodiment of the present invention when it is focused on the object located at the extremely short distance;

FIG. 17A, FIG. 17B, FIG. 17C, FIG. 17D, FIG. 17E and FIG. 17F show curves illustrating aberration characteristics of the fourth embodiment of the present invention when it is focused on the object located at the infinite distance;

FIG. 18A, FIG. 18B, FIG. 18C, FIG. 18D, FIG. 18E and FIG. 18F show curves illustrating aberration characteristics of the fourth embodiment of the present invention when it is focused on the object located at the extremely short distance;

FIG. 19A, FIG. 19B, FIG. 19C, FIG. 19D, FIG. 19E and FIG. 19F show graphs illustrating aberration characteristics of the fifth embodiment of the present invention when it is focused on the object located at the infinite distance;

FIG. 20A, FIG. 20B, FIG. 20C, FIG. 20D, FIG. 20E and FIG. 20F show graphs illustrating aberration characteristics of the fifth embodiment of the present invention when it is focused on the object located at the extremely short distance;

FIG. 21A, FIG. 21B, FIG. 21C, FIG. 21D, FIG. 21E and FIG. 21F show graphs illustrating aberration characteristics of the sixth embodiment of the present invention when it is focused on the object located at the infinite distance;

FIG. 22A, FIG. 22B, FIG. 22C, FIG. 22D, FIG. 22E and FIG. 22F show graphs visualizing aberration characteristics of the sixth embodiment of the present invention when it is focused on the object located at the extremely short distance;

FIG. 23A, FIG. 23B, FIG. 23C, FIG. 23D, FIG. 23E and FIG. 23F show graphs visualizing aberration characteristics of the seventh embodiment of the present invention when it is focused on the object located at the infinite distance;

FIG. 24A, FIG. 24B, FIG. 24C, FIG. 24D, FIG. 24E and FIG. 24F show aberration characteristics of the seventh embodiment of the present invention when it is focused on the object located at the extremely short distance;

FIG. 25A, FIG. 25B, FIG. 25C, FIG. 25D, FIG. 25E and FIG. 25F show graphs visualizing aberration characteristics of the eighth embodiment of the present invention when it is focused on the object located at the infinite distance;

FIG. 26A, FIG. 26B, FIG. 26C, FIG. 26D, FIG. 26E and FIG. 26F show graphs illustrating aberration characteristics of the eighth embodiment of the present invention when it is focused on the object located at the extremely short distance;

FIG. 27A, FIG. 27B, FIG. 27C, FIG. 27D, FIG. 27E and FIG. 27F show graphs illustrating aberration characteristics of the ninth embodiment of the present invention when it is focused on the object located at the infinite distance;

FIG. 28A, FIG. 28B, FIG. 28C, FIG. 28D, FIG. 28E and FIG. 28F show graphs illustrating aberration characteristics of the ninth embodiment of the present invention when it is focused on the object located at the extremely short distance;

FIG. 29A, FIG. 29B, FIG. 29C, FIG. 29D, FIG. 29E and FIG. 29F show curves visualizing aberration characteristics of the tenth embodiment of the present invention when it is focused on the object located at the infinite distance; and FIG. 30A, FIG. 30B, FIG. 30C, FIG. 30D, FIG. 30E and FIG. 30F show curves visualizing aberration characteristics of the tenth embodiment of the present invention when it is focused on the object located at the extremely short distance.

DETAILED DESCRIPTION OF THE DRAWINGS

Figure 1A:
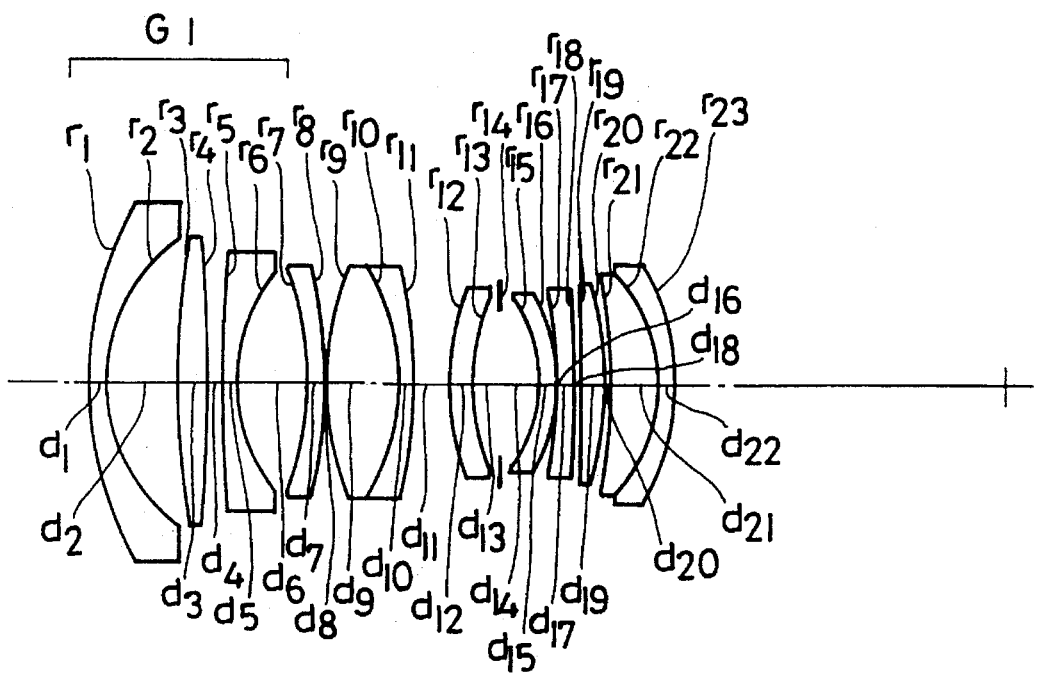
FIG. 1A and FIG. 1B show sectional views illustrating a composition of a first embodiment of the wide-angle lens system according to the present invention.

Now, the wide-angle lens system according to the present invention will be described more detailedly below with reference to the preferred embodiments thereof illustrated in the accompanying drawings and given in the form of the following numerical data:

Embodiment 1

| | | |
|---|---|---|
| $f = 28.25$ mm, | F number = 2.04, | $2\omega = 76.06°$ |
| $r_1 = 38.5408$ | | |
| $d_1 = 2.0821$ | $n_1 = 1.81600$ | $v_1 = 46.62$ |
| $r_2 = 19.4886$ | | |
| $d_2 = 7.9789$ | | |
| $r_3 = 86.1171$ | | |
| $d_3 = 3.5010$ | $n_2 = 1.80518$ | $v_2 = 25.43$ |
| $r_4 = -200.9591$ | | |
| $d_4 = D_1$ (variable) | | |
| $r_5 = 155.5767$ | | |
| $d_5 = 1.8176$ | $n_3 = 1.56873$ | $v_3 = 63.16$ |
| $r_6 = 20.4973$ | | |
| $d_6 = 7.7971$ | | |
| $r_7 = -33.5471$ | | |
| $d_7 = 1.8701$ | $n_4 = 1.62588$ | $v_4 = 35.70$ |
| $r_8 = -56.9362$ | | |
| $d_8 = 0.1500$ | | |
| $r_9 = 32.1955$ | | |
| $d_9 = 8.0695$ | $n_5 = 1.81600$ | $v_5 = 46.62$ |
| $r_{10} = -24.1592$ | | |
| $d_{10} = 1.7181$ | $n_6 = 1.75520$ | $v_6 = 27.51$ |
| $r_{11} = -53.6837$ | | |
| $d_{11} = 3.9586$ | | |
| $r_{12} = 29.0462$ | | |
| $d_{12} = 2.6241$ | $n_7 = 1.67270$ | $v_7 = 32.10$ |
| $r_{13} = 25.0542$ | | |
| $d_{13} = 3.0923$ | | |
| $r_{14} = \infty$ (stop) | | |
| $d_{14} = 4.4960$ | | |
| $r_{15} = -15.7567$ | | |
| $d_{15} = 1.7821$ | $n_8 = 1.75520$ | $v_8 = 27.51$ |
| $r_{16} = -21.3887$ | | |
| $d_{16} = 0.1500$ | | |
| $r_{17} = -48.3373$ | | |
| $d_{17} = 1.9426$ | $n_9 = 1.80518$ | $v_9 = 25.43$ |
| $r_{18} = -170.0088$ | | |
| $d_{18} = 0.5972$ | | |
| $r_{19} = -395.7774$ | | |
| $d_{19} = 2.8447$ | $n_{10} = 1.67790$ | $v_{10} = 55.33$ |
| $r_{20} = -33.8506$ (aspherical surface) | | |
| $d_{20} = D_2$ (variable) | | |
| $r_{21} = -60.2366$ | | |
| $d_{21} = 5.3706$ | $n_{11} = 1.77250$ | $v_{11} = 49.66$ |

-continued $r_{22} = -17.5236$
$\quad d_{22} = 1.6794 \quad n_{12} = 1.75520 \quad v_{12} = 27.51$
$r_{23} = -25.7880$
aspherical surface coefficient $P = 1.0, \quad A_4 = 0.18334 \times 10^{-4}, \quad A_6 = 0.30606 \times 10^{-7}$
$\quad\quad\quad A_8 = -0.52166 \times 10^{-10}, \quad A_{10} = 0.16944 \times 10^{-12}$

|  | infinite distance | $-1/5.6$ X |
|---|---|---|
| $D_1$ | 1.593 | 0.465 |
| $D_2$ | 0.749 | 1.803 |

$f/f_1 = -0.915, f/f_R = 0.551$
$(R_F + R_R)/(R_F - R_R) = (r_6 + r_7)/(r_6 - r_7) = -0.241$
$(R_{FS} + R_{RS})/(R_{FS} - R_{RS}) =$
$(r_{13} + r_{15})/(r_{13} - r_{15}) = 0.228$
$D_C/f = (d_9 + d_{10})/f = 0.346, |\Delta x|/f = 6.60 \times 10^{-3}$ Embodiment 2

$f = 28.25$ mm, F number = 2.03, $2\omega = 76.06°$
$r_1 = 63.1556$
$\quad d_1 = 2.2309 \quad n_1 = 1.83481 \quad v_1 = 42.72$
$r_2 = 23.4988$
$\quad d_2 = 7.4707$
$r_3 = 73.9423$
$\quad d_3 = 4.1424 \quad n_2 = 1.80518 \quad v_2 = 25.43$
$r_4 = -282.7096$
$\quad d_4 = D_1$ (variable)
$r_5 = 80.3451$
$\quad d_5 = 1.7526 \quad n_3 = 1.51633 \quad v_3 = 64.15$
$r_6 = 22.0225$
$\quad d_6 = 7.4954$
$r_7 = -56.6543$
$\quad d_7 = 1.7515 \quad n_4 = 1.58144 \quad v_4 = 40.75$
$r_8 = 63.1483$
$\quad d_8 = 0.1500$
$r_9 = 31.8467$
$\quad d_9 = 7.2789 \quad n_5 = 1.81600 \quad v_5 = 46.62$
$r_{10} = -29.3807$
$\quad d_{10} = 1.7445 \quad n_6 = 1.75520 \quad v_6 = 27.51$
$r_{11} = -55.6671$
$\quad d_{11} = D_2$ (variable)
$r_{12} = 25.0105$
$\quad d_{12} = 2.7481 \quad n_7 = 1.77250 \quad v_7 = 49.66$
$r_{13} = 32.1678$
$\quad d_{13} = 6.2729$
$r_{14} = \infty$ (stop)
$\quad d_{14} = 5.6354$
$r_{15} = -16.2897$
$\quad d_{15} = 1.7981 \quad n_8 = 1.80518 \quad v_8 = 25.43$
$r_{16} = -21.9192$
$\quad d_{16} = 0.8484$
$r_{17} = -33.1947$
$\quad d_{17} = 1.7817 \quad n_9 = 1.80518 \quad v_9 = 25.43$
$r_{18} = 327.1839$
$\quad d_{18} = 2.9319 \quad n_{10} = 1.67790 \quad v_{10} = 55.33$
$r_{19} = -48.0718$ (aspherical surface)
$\quad d_{19} = 0.1500$
$r_{20} = -693.9452$
$\quad d_{20} = 5.7211 \quad n_{11} = 1.74100 \quad v_{11} = 52.68$
$r_{21} = -22.5323$
aspherical surface coefficient $P = 1.0, \quad A_4 = 0.22416 \times 10^{-4}, \quad A_6 = 0.25421 \times 10^{-7}$
$\quad\quad\quad A_8 = -0.52061 \times 10^{-10}, \quad A_{10} = -0.66652 \times 10^{-13}$

|  | infinite distance | $-1/5.6$ X |
|---|---|---|
| $D_1$ | 2.287 | 0.500 |
| $D_2$ | 1.780 | 0.535 |

$f/f_1 = -0.734, f/f_R = 0.529$
$(R_F + R_R)/(R_F - R_R) =$
$(r_6 + r_7)/(r_6 - r_7) = -0.440$
$(R_{FS} + R_{RS})/(R_{FS} - R_{RS}) =$
$(r_{13} + r_{15})/(r_{13} - r_{15}) = 0.328$
$D_C/f = (d_9 + d_{10})/f = 0.319, |\Delta x|/f = 7.60 \times 10^{-3}$ Embodiment 3

$f = 28.35$ mm, F number = 2.03, $2\omega = 75.91°$
$r_1 = 53.7486$
$\quad d_1 = 2.0612 \quad n_1 = 1.81600 \quad v_1 = 46.62$
$r_2 = 21.6395$
$\quad d_2 = 8.8810$
$r_3 = 93.1872$
$\quad d_3 = 3.7731 \quad n_2 = 1.80518 \quad v_2 = 25.43$
$r_4 = -245.6779$
$\quad d_4 = D_1$ (variable)
$r_5 = 80.3218$
$\quad d_5 = 1.6552 \quad n_3 = 1.60311 \quad v_3 = 60.70$
$r_6 = 25.5832$
$\quad d_6 = 6.5382$
$r_7 = -75.5025$ (aspherical surface)
$\quad d_7 = 1.6914 \quad n_4 = 1.59551 \quad v_4 = 39.21$
$r_8 = 56.7130$
$\quad d_8 = 0.1500$
$r_9 = 31.5499$
$\quad d_9 = 7.1750 \quad n_5 = 1.83481 \quad v_5 = 42.72$
$r_{10} = -32.1637$
$\quad d_{10} = 1.6819 \quad n_6 = 1.75520 \quad v_6 = 27.51$
$r_{11} = -94.4425$
$\quad d_{11} = D_2$ (variable)
$r_{12} = 25.9405$
$\quad d_{12} = 2.9364 \quad n_7 = 1.77250 \quad v_7 = 49.66$
$r_{13} = 46.4368$
$\quad d_{13} = 6.9646$
$r_{14} = \infty$ (stop)
$\quad d_{14} = 5.3095$
$r_{15} = -18.8378$
$\quad d_{15} = 1.7419 \quad n_8 = 1.75520 \quad v_8 = 27.51$
$r_{16} = 53.8952$
$\quad d_{16} = 3.9452 \quad n_9 = 1.67790 \quad v_9 = 55.33$
$r_{17} = -46.0711$ (aspherical surface)
$\quad d_{17} = 1.7874$
$r_{18} = -914.6193$
$\quad d_{18} = 5.7503 \quad n_{10} = 1.77250 \quad v_{10} = 49.66$
$r_{19} = -22.5627$
aspherical surface coefficient (7th surface)

$P = 1.0, \quad A_4 = 0.45953 \times 10^{-5}, \quad A_6 = 0.99991 \times 10^{-8}$
$\quad\quad\quad A_8 = -0.20837 \times 10^{-10}, \quad A_{10} = 0.17491 \times 10^{-12}$ (17th surface)

$P = 1.0, \quad A_4 = 0.29966 \times 10^{-4}, \quad A_6 = 0.40779 \times 10^{-7}$
$\quad\quad\quad A_8 = -0.58636 \times 10^{-10}, \quad A_{10} = -0.30654 \times 10^{-12}$

|  | infinite distance | $-1/5.6$ X |
|---|---|---|
| $D_1$ | 2.325 | 0.543 |
| $D_2$ | 1.824 | 0.547 |

$f/f_1 = -0.775, f/f_R = 0.496$
$(R_F + R_R)/(R_F - R_R) =$
$(r_6 + r_7)/(r_6 - r_7) = -0.494$
$(R_{FS} + R_{RS})/(R_{FS} - R_{RS}) =$
$(r_{13} + r_{15})/(r_{13} - r_{15}) = 0.423$
$D_C/f = (d_9 + d_{10})/f = 0.312, |\Delta x|/f = 9.11 \times 10^{-3}$ Embodiment 4

$f = 28.46$ mm, F number = 2.03, $2\omega = 75.58°$
$r_1 = 75.7514$
$\quad d_1 = 2.2600 \quad n_1 = 1.80400 \quad v_1 = 46.57$
$r_2 = 24.1260$
$\quad d_2 = 7.4835$
$r_3 = 85.6536$
$\quad d_3 = 3.9000 \quad n_2 = 1.84666 \quad v_2 = 23.78$
$r_4 = -194.0425$
$\quad d_4 = D_1$ (variable)
$r_5 = 37.9213$
$\quad d_5 = 1.9000 \quad n_3 = 1.60311 \quad v_3 = 60.70$
$r_6 = 18.2718$
$\quad d_6 = 7.4312$
$r_7 = -36.9432$
$\quad d_7 = 1.8000 \quad n_4 = 1.64769 \quad v_4 = 33.80$
$r_8 = 124.2881$
$\quad d_8 = 0.1500$
$r_9 = 36.3045$
$\quad d_9 = 6.8998 \quad n_5 = 1.80400 \quad v_5 = 46.57$
$r_{10} = -27.7305$
$\quad d_{10} = 2.0000 \quad n_6 = 1.80518 \quad v_6 = 25.43$
$r_{11} = -43.5392$
$\quad d_{11} = D_2$ (variable)
$r_{12} = 28.7501$
$\quad d_{12} = 2.8000 \quad n_7 = 1.80400 \quad v_7 = 46.57$
$r_{13} = 45.4702$
$\quad d_{13} = 7.7668$

-continued

```
r₁₄ = ∞ (stop)
    d₁₄ = 5.4718
r₁₅ = -18.4881
    d₁₅ = 2.5828        n₈ = 1.84666    ν₈ = 23.78
r₁₆ = -58.2185
    d₁₆ = 4.5941        n₉ = 1.69680    ν₉ = 55.52
r₁₇ = -21.2134
    d₁₇ = 0.1500
r₁₈ = 601.7135
    d₁₈ = 3.9998        n₁₀ = 1.81600   ν₁₀ = 46.62
r₁₉ = -50.7445 (aspherical surface)
``` aspherical surface coefficient $P = 1.0$, $A_4 = 0.87437 \times 10^{-5}$, $A_6 = 0.56152 \times 10^{-8}$
$A_8 = 0.67629 \times 10^{-10}$, $A_{10} = -0.16419 \times 10^{-12}$

|  | infinite distance | -1/5.0 X |
|---|---|---|
| $D_1$ | 1.892 | 0.499 |
| $D_2$ | 2.557 | 0.500 |

$f/f_1 = -0.726$, $f/f_R = 0.467$
$(R_F + R_R)/(R_F - R_R) =$
$(r_6 + r_7)/(r_6 - r_7) = -0.338$
$(R_{FS} + R_{RS})/(R_{FS} - R_{RS}) =$
$(r_{13} + r_{15})/(r_{13} - r_{15}) = 0.422$
$D_C/f = (d_9 + d_{10})/f = 0.313$, $|\Delta x|/f = 2.84 \times 10^{-3}$

Embodiment 5

$f = 28.46$ mm,    F number = 2.04,    $2\omega = 75.76°$

```
r₁ = 53.6658
    d₁ = 2.2881         n₁ = 1.81600    ν₁ = 46.62
r₂ = 22.8214
    d₂ = 8.2817
r₃ = 127.6934
    d₃ = 3.7946         n₂ = 1.80518    ν₂ = 25.43
r₄ = -202.0670
    d₄ = D₁ (variable)
r₅ = 98.0057
    d₅ = 1.7934         n₃ 1.60311      ν₃ = 60.70
r₆ = 26.4413
    d₆ = 6.8366
r₇ = -52.3455
    d₇ = 1.7939         n₄ = 1.59551    ν₄ = 39.21
r₈ = 126.9261
    d₈ = 0.1500
r₉ = 35.2768
    d₉ = 7.0918         n₅ = 1.83481    ν₅ = 42.72
r₁₀ = -28.8419
    d₁₀ = 1.7931        n₆ = 1.75520    ν₆ = 27.51
r₁₁ = -69.9000
    d₁₁ = D₂ (variable)
r₁₂ = 25.8777
    d₁₂ = 2.9897        n₇ = 1.77250    ν₇ = 49.66
r₁₃ = 37.6353
    d₁₃ = 6.6994
r₁₄ = ∞ (stop)
    d₁₄ = 6.2338
r₁₅ = -18.4109
    d₁₅ = 1.7953        n₈ = 1.75520    ν₈ = 27.51
r₁₆ = 72.7063
    d₁₆ = 3.6366        n₉ = 1.67790    ν₉ = 55.33
r₁₇ = -42.7657 (aspherical surface)
    d₁₇ = 0.9774
r₁₈ = -850.7289
    d₁₈ = 5.8926        n₁₀ = 1.77250   ν₁₀ = 49.66
r₁₉ = -22.0879
``` aspherical surface coefficient $P = 1.0$, $A_4 = 0.27828 \times 10^{-4}$, $A_6 = 0.42208 \times 10^{-7}$
$A_8 = -0.67992 \times 10^{-10}$, $A_{10} = -0.23513 \times 10^{-12}$

|  | infinite distance | -1/5.6 X |
|---|---|---|
| $D_1$ | 2.391 | 0.547 |
| $D_2$ | 1.972 | 0.548 |

$f/f_1 = -0.792$, $f/f_R = 0.517$
$(R_F + R_R)/(R_F - R_R) =$
$(r_6 + R_7)/(r_6 - r_7) = 0.329$
$(R_{FS} + R_{RS})/(R_{FS} - R_{RS}) =$
$(r_{13} + R_{15})/r_{13} - r_{15}) = 0.343$
$D_C/f = (d_9 + d_{10})/f = 0.312$, $|\Delta x|/f = 8.73 \times 10^{-3}$

Embodiment 6

$f = 28.55$ mm,    F number = 2.04,    $2\omega = 75.45°$

```
r₁ = 77.2609
    d₁ = 2.2600         n₁ = 1.80400    ν₁ = 46.57
r₂ = 21.4840
    d₂ = 8.0580
r₃ = 959.8483
    d₃ = 3.9000         n₂ = 1.84666    ν₂ = 23.78
r₄ = -82.6442
    d₄ = D₁ (variable)
r₅ = 55.3987
    d₅ = 1.9000         n₃ = 1.60311    ν₃ = 60.70
r₆ = 31.6344
    d₆ = 7.1133
r₇ = -38.4777
    d₇ = 1.8000         n₄ = 1.64769    ν₄ = 33.80
r₈ = -220.3740
    d₈ = 0.1500
r₉ = 51.4223
    d₉ = 6.8940         n₅ = 1.80400    ν₅ = 46.57
r₁₀ = -28.3015
    d₁₀ = 2.0000        n₆ = 1.80518    ν₆ = 25.43
r₁₁ = -40.8260
    d₁₁ = 3.9763
r₁₂ = 22.5868
    d₁₂ = 2.8000        n₇ = 1.77250    ν₇ = 49.66
r₁₃ = 25.9862
    d₁₃ = 8.5681
r₁₄ = ∞ (stop)
    d₁₄ = 4.6891
r₁₅ = -18.1913
    d₁₅ = 1.4902        n₈ = 1.80518    ν₈ = 25.43
r₁₆ = 107.5300
    d₁₆ = 3.4553        n₉ = 1.67790    ν₉ = 55.33
r₁₇ = -50.5628 (aspherical surface)
    d₁₇ = 0.1500
r₁₈ = -461.0602
    d₁₈ = 5.4843        n₁₀ = 1.83481   ν₁₀ = 42.72
r₁₉ = -21.1007
``` aspherical surface coefficient $P = 1.0$, $A_4 = 0.26238 \times 10^{-4}$, $A_6 = 0.21902 \times 10^{-7}$
$A_8 = -0.64562 \times 10^{-10}$, $A_{10} = -0.29887 \times 10^{-12}$

|  | infinite distance | -1/5.6 X |
|---|---|---|
| $D_1$ | 2.215 | 0.565 |

$f/f_1 = -0.659$, $f/f_R = 0.466$
$(R_F + R_R)/(R_F - R_R) =$
$(r_6 + r_7)/(r_6 - r_7) = -0.098$
$(R_{FS} + R_{RS})/(R_{FS} - R_{RS}) =$
$(r_{13} + r_{15})/(r_{13} - r_{15}) = 0.176$
$D_C/f = (d_9 + d_{10})/f = 0.312$, $|\Delta x|/f = 7.77 \times 10^{-3}$

Embodiment 7

$f = 28.5$ mm,    F number = 2.04,    $2\omega = 75.40°$

```
r₁ = 56.3702
    d₁ = 2.2600         n₁ = 1.80400    ν₁ = 46.57
r₂ = 20.8366
    d₂ = 7.3167
r₃ = 123.5066
    d₃ = 3.8800         n₂ = 1.84666    ν₂ = 23.78
r₄ = -104.3243
    d₄ = D₁ (variable)
r₅ = 33.0653
    d₅ = 1.9000         n₃ = 1.60311    ν₃ = 60.70
r₆ = 19.0697
    d₆ = 7.0000
r₇ = -29.4732
    d₇ = 1.8000         n₄ = 1.64769    ν₄ = 33.80
r₈ = 265.1648
    d₈ = 0.1500
r₉ = 45.9944
    d₉ = 6.6000         n₅ = 1.80400    ν₅ = 46.57
r₁₀ = -23.7688
    d₁₀ = 2.0000        n₆ = 1.80518    ν₆ = 25.43
r₁₁ = -34.3756
    d₁₁ = D₂ (variable)
r₁₂ = 34.1440
    d₁₂ = 2.8000        n₇ = 1.77250    ν₇ = 49.66
r₁₃ = 47.3121
    d₁₃ = 7.7048
r₁₄ = ∞ (stop)
    d₁₄ = 7.1644
```

-continued

```
r15 = -20.5293
    d15 = 1.5000         n8 = 1.80518        ν8 = 25.43
r16 = -319.9420
    d16 = 3.6165         n9 = 1.83481        ν9 = 42.72
r17 = -37.8427
    d17 = 0.1500
r18 = -835.6707
    d18 = 5.6575         n10 = GRIN lens
r19 = -26.2237
              infinite distance    -0.19871 X
    D1        1.8000                0.5000
    D2        2.5001                0.5000
GRIN lens
              N0              N1
    d line    1.60311         0.46293 × 10⁻¹
    C line    1.60008         0.46080 × 10⁻¹
    F line    1.61002         0.46792 × 10⁻¹
f/f1 = -0.614, f/fR = 0.527
(RF + RR)/(RF - RR) =
(r6 + r7)/(r6 - r7) = -0.214
(RFS + RRS)/(RFS - RRS) =
(r13 + r15)/(r13 - r15) = 0.395
DC/f = (d9 + d10)/f = 0.302
```

Embodiment 8

```
       f = 28.5 mm,   F number = 2.04,   2ω = 75.26°
r1 = 61.0445
    d1 = 2.2600          n1 = 1.80400        ν1 = 46.57
r2 = 23.0430
    d2 = 7.5611
r3 = 215.6589
    d3 = 3.8800          n2 = 1.84666        ν2 = 23.78
r4 = -112.9342
    d4 = D1 (variable)
r5 = 39.1031
    d5 = 1.9000          n3 = 1.60311        ν3 = 60.70
r6 = 22.0958
    d6 = 6.2000
r7 = -33.3715
    d7 = 1.8000          n4 = 1.64769        ν4 = 33.80
r8 = 489.0748
    d8 = 0.1500
r9 = 48.7780
    d9 = 7.1543          n5 = 1.80400        ν5 = 46.57
r10 = -31.1237
    d10 = 2.0000         n6 = 1.80518        ν6 = 25.43
r11 = -42.1786
    d11 = D2 (variable)
r12 = 31.1788
    d12 = 2.8000         n7 = 1.77250        ν7 = 49.66
r13 = 48.5705
    d13 = 7.6391
r14 = ∞ (stop)
    d14 = 7.0844
r15 = -21.9637
    d15 = 1.5000         n8 = 1.80518        ν8 = 25.43
r16 = 178.9699
    d16 = 3.5511         n9 = GRIN lens
r17 = -49.8028
    d17 = 0.1500
r18 = -105.9556
    d18 = 5.5314         n10 = 1.83481       ν10 = 42.72
r19 = -23.6700
              infinite distance    -0.19871 X
    D1        1.8407                0.5000
    D2        2.7976                0.5000
GRIN lens
              N0              N1
    d line    1.65160         0.28285
    C line    1.64821         0.28115
    F line    1.65934         0.28681
f/f1 = -0.617, f/fR = 0.538
(RF + RR)/(RF - RR) =
(r6 + r7)/(r6 - r7) = -0.203
(RFS + RRS)/(RFS - RRS) =
(r13 + r15)/(r13 - r15) = 0.377
DC/f = (d9 + d10)/f = 0.321
```

Embodiment 9

```
       f = 28.5 mm,   F number = 2.04,   2ω = 75.40°
```

-continued

```
r1 = 48.8139
    d1 = 2.2600          n1 = 1.80400        ν1 = 46.57
r2 = 20.0633
    d2 = 7.3167
r3 = 191.8010
    d3 = 3.8800          n2 = 1.84666        ν2 = 23.78
r4 = -102.8595
    d = D1 (variable)
r5 = 30.8677
    d5 = 1.9000          n3 = 1.60311        ν3 = 60.70
r6 = 19.1292
    d6 = 7.0000
r7 = -30.5972
    d7 = 1.8000          n4 = 1.64769        ν4 = 33.80
r8 = 351.2147
    d8 = 0.1500
r9 = 44.4090
    d9 = 6.6000          n5 = 1.80400        ν5 = 46.57
r10 = -25.7040
    d10 = 2.0000         n6 = 1.80518        ν6 = 25.43
r11 = -35.0436
    d11 = D2 (variable)
r12 = 35.3282
    d12 = 2.8000         n7 = 1.77250        ν7 = 49.66
r13 = 46.8352
    d13 = 7.6962
r14 = ∞ (stop)
    d14 = 7.1527
r15 = -20.0505
    d15 = 1.5000         n8 = 1.84666        ν8 = 23.78
r16 = -101.8755
    d16 = 3.6009         n9 = 1.83481        ν9 = 42.72
r17 = -35.8818
    d17 = 0.1500
r18 = -252.2896
    d18 = 5.6934         n10 = GRIN lens
r19 = -28.1141
              infinite distance    -0.19871 x
    D1        1.8000                0.5000
    D2        2.5001                0.5000
GRIN lens
              N0              N1                   N2
    d line    1.60311         0.54155 × 10⁻¹       -0.46510 × 10⁻³
    C line    1.60008         0.53860 × 10⁻¹       -0.46256 × 10⁻³
    F line    1.61002         0.54844 × 10⁻¹       -0.47102 × 10⁻³
f/f1 = -0.620, f/fR = 0.537
(RF + RR)/(RF - RR) =
(r6 + r7)/(r6 - r7) = -0.231
(RFS + RRS)/(RFS - RRS) =
(r13 + r15)/(r13 - r15) = 0.400
DC/f = (d9 + d10)/f = 0.302
```

Embodiment 10

```
       f = 28.5 mm,   F number = 2.04,   2ω = 75.38°
r1 = 55.6592
    d1 = 2.2600          n1 = 1.80400        ν1 = 46.57
r2 = 20.4921
    d2 = 7.7000
r3 = 211.8296
    d3 = 3.8800          n2 = 1.84666        ν2 = 23.78
r4 = -95.9704
    d4 = D1 (variable)
r5 = 29.3647
    d5 = 1.9000          n3 = 1.60311        ν3 = 60.70
r6 = 19.1964
    d6 = 7.5000
r7 = -31.9715
    d7 = 1.8000          n4 = 1.64769        ν4 = 33.80
r8 = 1251.1144
    d8 = 0.1500
r9 = 46.1488
    d9 = 6.6000          n5 = 1.80400        ν5 = 46.57
r10 = -25.2018
    d10 = 2.0000         n6 = 1.80518        ν6 = 25.43
r11 = -35.0909
    d11 = D2 (variable)
r12 = 34.4913
    d12 = 2.8000         n7 = 1.77250        ν7 = 49.66
r13 = 42.6899
    d13 = 7.1516
```

-continued $r_{14} = \infty$ (stop)
$\quad d_{14} = 7.0081$
$r_{15} = -19.7529$
$\quad d_{15} = 1.5000 \quad n_8 = 1.80518 \quad \nu_8 = 25.43$
$r_{16} = -235.9823$
$\quad d_{16} = 3.5028 \quad n_9 = 1.83481 \quad \nu_9 = 42.72$
$r_{17} = -41.4220$
$\quad d_{17} = 0.1500$
$r_{18} = -183.3826$
$\quad d_{18} = 5.5974 \quad n_{10} = $ GRIN lens
$r_{19} = 25.7740$

|  | infinite distance | $-0.19871 \times$ |
|---|---|---|
| $D_1$ | 1.8000 | 0.5000 |
| $D_2$ | 2.5001 | 0.5000 |

GRIN lens

|  | $N_0$ | $N_1$ | $N_2$ |
|---|---|---|---|
| d line | 1.60311 | $0.49760 \times 10^{-1}$ | $-0.33615 \times 10^{-3}$ |
| C line | 1.60008 | $0.49488 \times 10^{-1}$ | $-0.33413 \times 10^{-3}$ |
| F line | 1.61002 | $0.50393 \times 10^{-1}$ | $-0.34042 \times 10^{-3}$ |

$f/f_1 = -0.612$, $f/f_R = 0.511$
$(R_F + R_R)/(R_F - R_R) =$
$(r_6 + r_7)/(r_6 - r_7) = -0.250$
$(R_{FS} + R_{RS})/(R_{FS} - R_{RS}) =$
$(r_{13} + r_{15})/(r_{13} - r_{15}) = 0.367$
$D_C/f = (d_9 + d_{10})/f = 0.302$ wherein the reference symbols $r_1, r_2, \ldots$ represent radii of curvature on surfaces of the respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $\nu_1, \nu_2, \ldots$ represent Abbe's numbers of the respective lens elements.

Figure 1B:
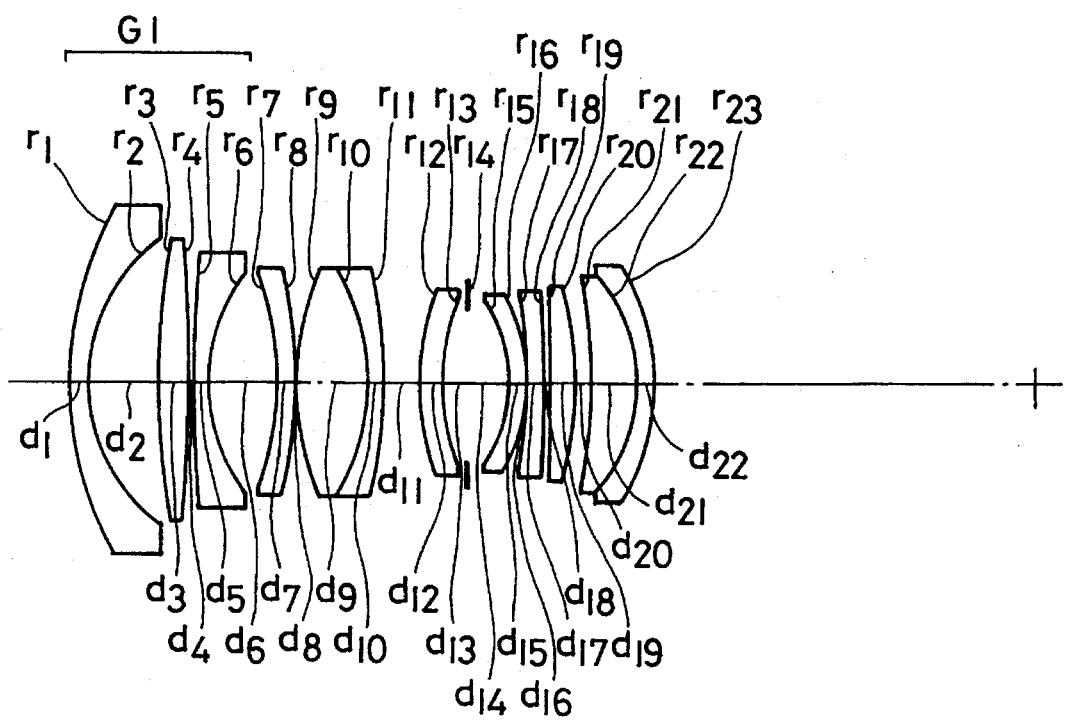

The first embodiment has the composition illustrated in FIG. 1A and FIG. 1B, or is composed of 10 lens components of 12 lens elements so as to satisfy the conditions (1) through (6). In the wide-angle lens system preferred as the first embodiment of the present invention, an image side surface ($r_{20}$) of the third lens element disposed in the rear unit is configured as an aspherical surface for favorably correcting aberrations; and an airspace $d_4$ reserved between the second lens element and the third lens element disposed in the first lens unit as well as another airspace $d_{20}$ reserved between the third lens element and the fourth lens element disposed in the rear unit is used as a floating space. For focusing the lens system from an object located at an infinite distance onto another object located at the extremely short distance, the airspace $d_4$ is narrowed and the airspace $d_{20}$ is widened for reducing the variations of aberrations.

In the first embodiment, the radii of curvature $R_F$ and $R_R$ defined by the above-mentioned condition (3) correspond to a radius of curvature $r_6$ on an image side surface of a negative lens component which is disposed on the most image side in the first lens unit $G_1$ and a radius of curvature $r_7$ on an object side surface of a negative lens element which is disposed on the object side in the cemented lens component used in the front unit.

When the wide-angle lens system preferred as the first embodiment is focused on the object located at the infinite distance in the condition illustrated in FIG. 1A, it has the aberration characteristics shown in FIG. 11A, FIG. 11B, FIG. 11C, FIG. 11D, FIG. 11E and FIG. 11F. When this lens system is focused on the object located at the extremely short distance in the condition illustrated in FIG. 1B (set at a magnification of 1/5.6X), it has the aberration characteristics shown in FIG. 12A, FIG. 12B, FIG. 12C, FIG. 12D, FIG. 12E and FIG. 12F.

Figure 2A:
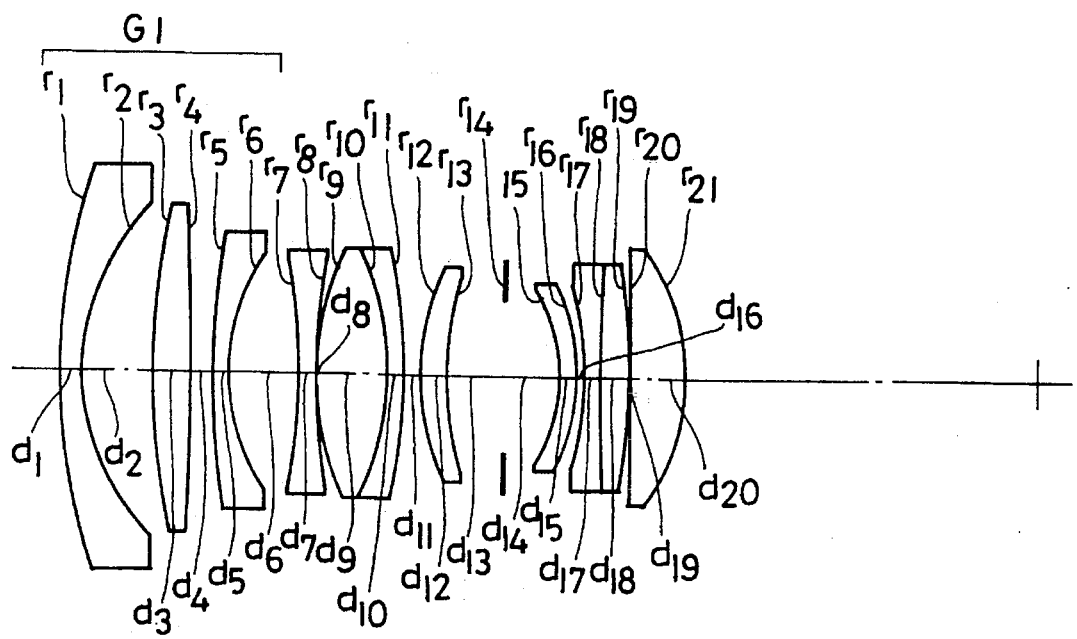
FIG. 2A and FIG. 2B show sectional views illustrating a composition of a second embodiment of the wide-angel lens system according to the present invention.
Figure 2B:
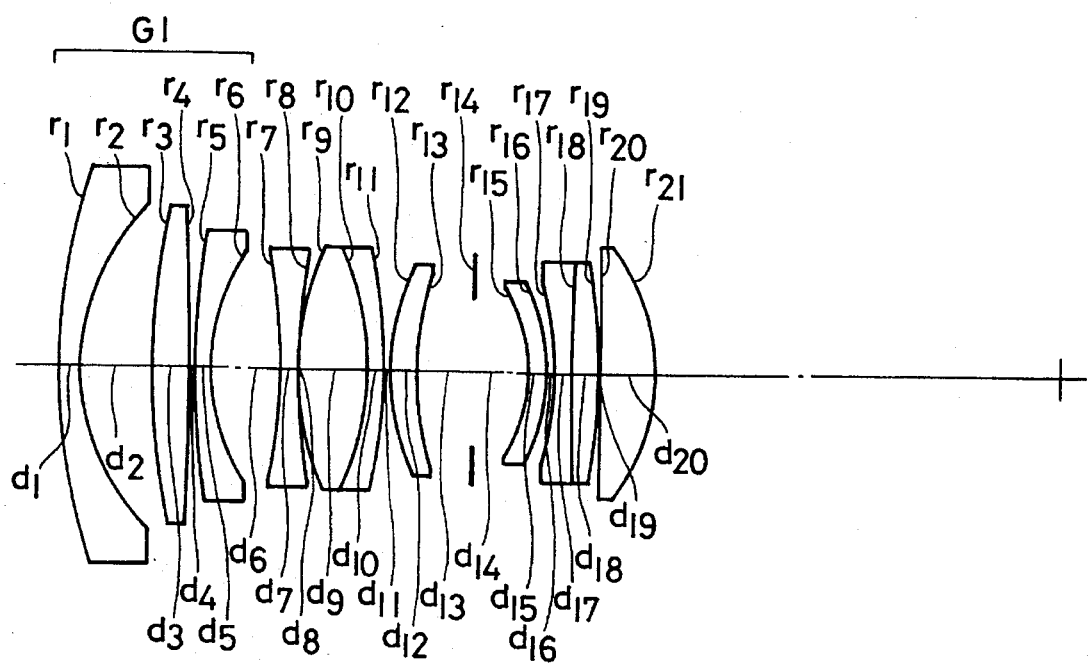

The second embodiment of the present invention is composed of 9 lens components of 11 lens element as illustrated in FIG. 2A and FIG. 2B so as to satisfy the conditions (1) through (6). In the second embodiment, an image side surface ($r_{19}$) of the third lens element disposed in the rear unit is configured as an aspherical surface for favorably correcting aberrations. Further, an airspace ($d_4$) reserved between the second lens element and the third lens element disposed in the first lens unit $G_1$ of the front unit as well as another airspace ($d_{11}$) reserved between the sixth lens element and the seventh lens element disposed in the front unit is used as a floating space which is to be narrowed for reducing the variations of aberrations to be caused by focusing the lens system from the object located at the infinite distance to the object located at the extremely short distance.

The second embodiment has the aberration characteristics illustrated in FIG. 13A, FIG. 13B, FIG. 13C, FIG. 13D, FIG. 13E and FIG. 13F when it is focused on the object located at the infinite distance in the condition shown in FIG. 2A or the aberration characteristics illustrated in FIG. 14A, FIG. 14B, FIG. 14C, FIG. 14D, FIG. 14E and FIG. 14F when it is focused on the object located at the extremely short distance in the condition shown in FIG. 2B (set at a magnification of $-1/5.6$).

Figure 3A:
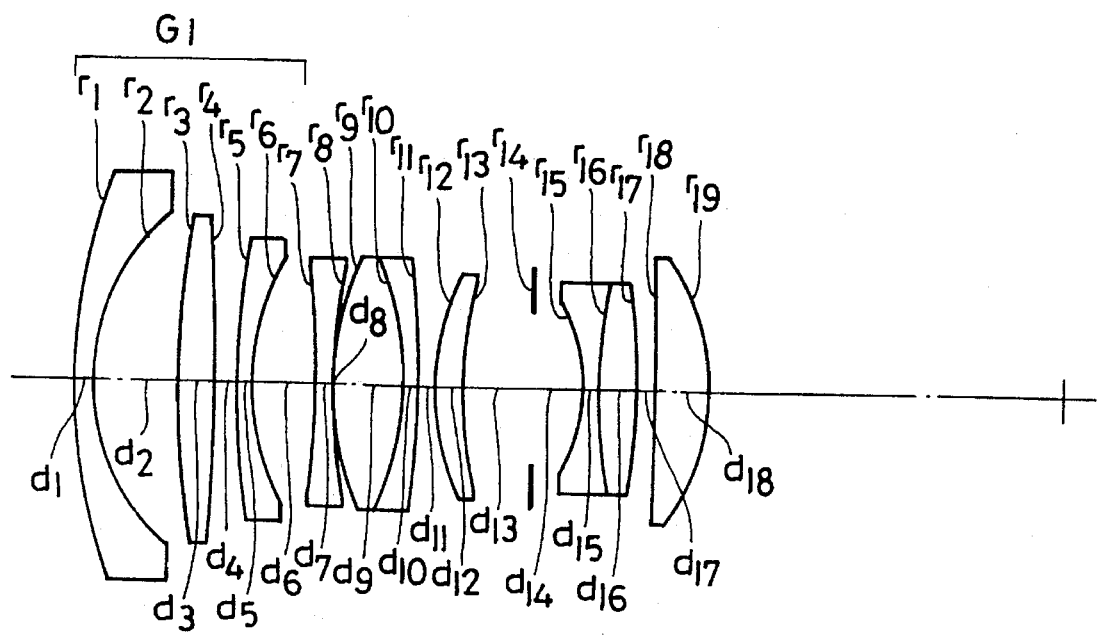
FIG. 3A and FIG. 3B show sectional views illustrating a composition of a third embodiment of the wide-angle lens system according to the present invention.
Figure 3B:
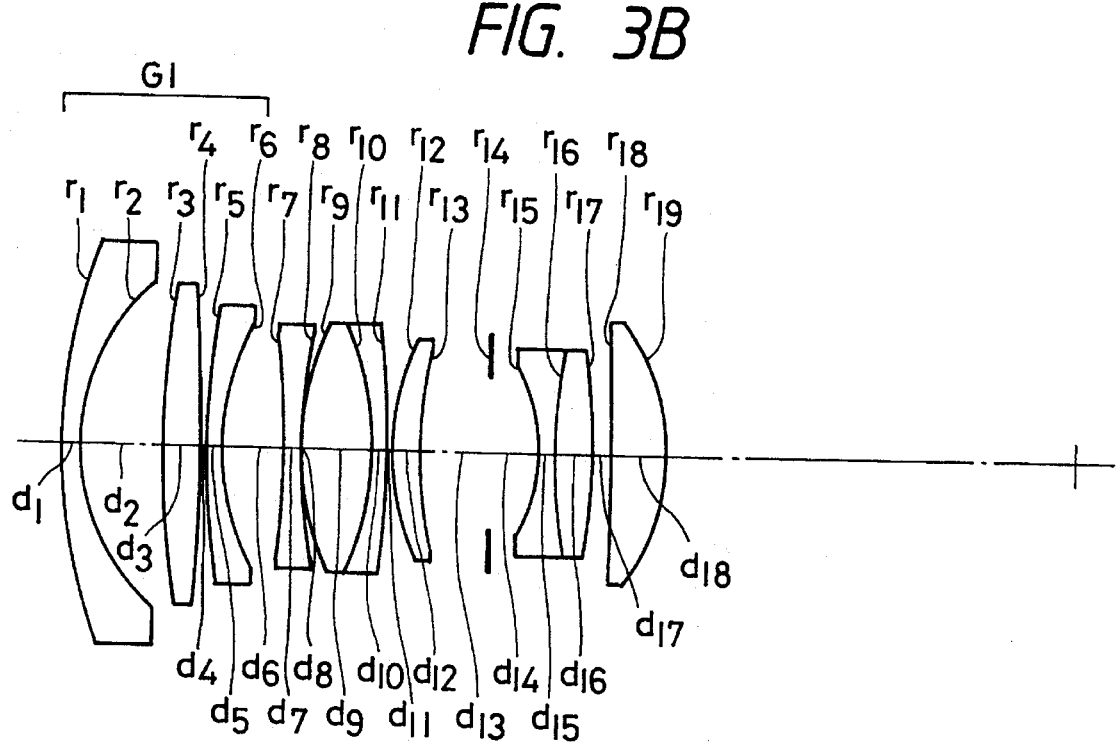

The third embodiment of the present invention is composed of 8 lens components of 10 lens elements as illustrated in FIG. 3A and FIG. 3B so as to satisfy the conditions (1) through (6). In the third embodiment, an object side surface ($r_7$) of the fourth lens element disposed in the front unit and an image side surface ($r_{17}$) of the second lens element disposed in the rear unit are configured as aspherical surfaces so that the wide-angle lens system can be composed of lens elements in a number smaller than that of the lens elements disposed in the first embodiment or the second embodiment while maintaining the aberrations favorably corrected therein. The aspherical surface used on the fourth lens element disposed in the front unit has a positive refractive power which is strengthened as portions of the aspherical surface are farther from the optical axis for correcting negative distortion produced by the front unit, whereas the aspherical surface used on the second lens element disposed in the rear unit has a positive refractive power which is weakened as portions of the aspherical surface are farther from the optical axis for correcting remarkable spherical aberration and sagittal coma produced by the rear unit. Further, the negative lens component disposed in the rear unit at the location adjacent to the stop is configured as a cemented lens component consisting of a negative lens element and a positive lens element for favorably correcting chromatic aberration as well in the third embodiment. Furthermore, an airspace ($d_4$) reserved between the second lens element and the third lens element disposed in the front unit as well as another airspace ($d_{11}$) reserved between the sixth lens element and the seventh lens element disposed in the front unit is used as a floating space which is to be narrowed for reducing the variations of aberrations which are to be caused by focusing the wide-angle lens system from the object located at the infinite distance to the object located at the extremely short distance.

The third embodiment has the aberration characteristics illustrated in FIG. 15A, FIG. 15B, FIG. 15C, FIG. 15D, FIG. 15E and FIG. 15F when it is focused on the object located at the infinite distance in the condition illustrated in FIG. 3A or the aberration characteristics illustrated in FIG. 16A, FIG. 16B, FIG. 16C, FIG. 16D, FIG. 16E and FIG. 16F when it is focused on the object located at the extremely short distance in the condition illustrated in FIG. 3B (set at a magnification of 1/5.6X).

Figure 4A:
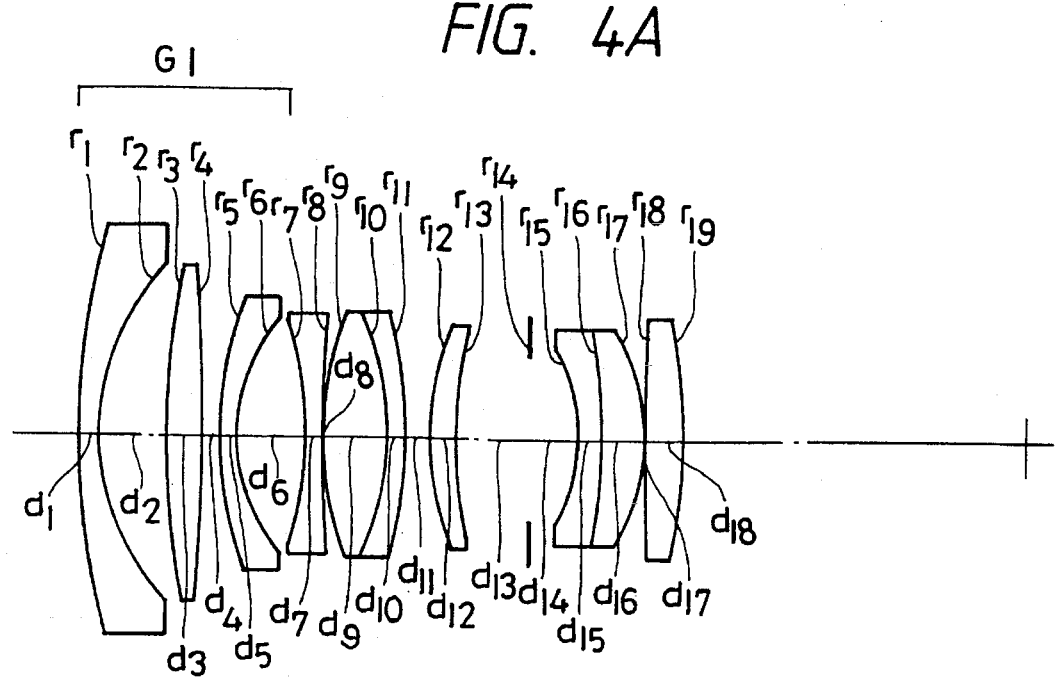
FIG. 4A and FIG. 4B show sectional views illustrating a composition of a fourth embodiment of the wide-angle lens system according to the present invention.
Figure 4B:
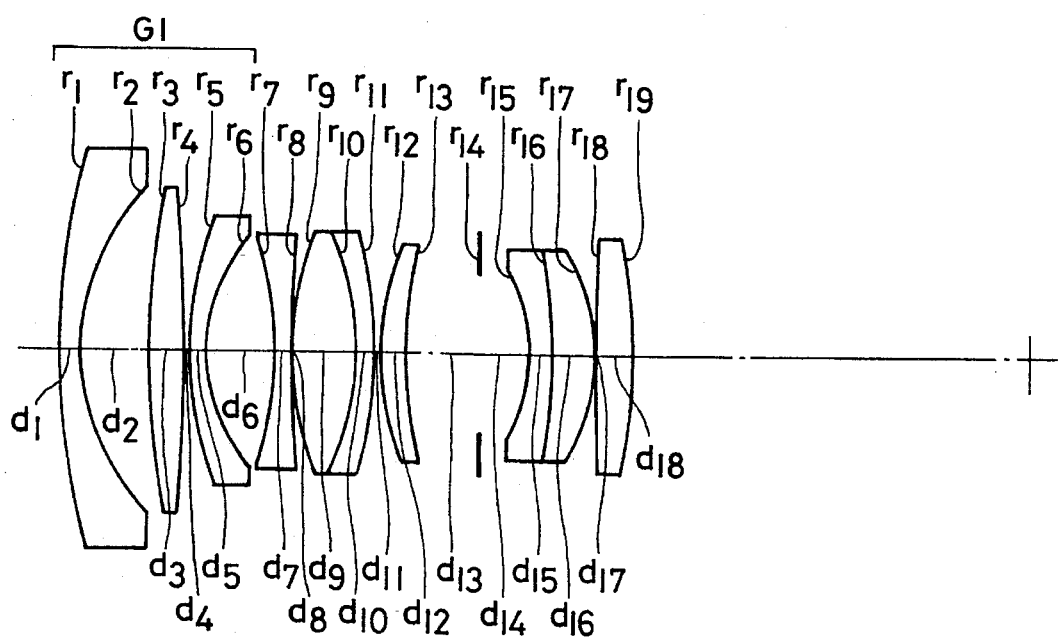

The fourth embodiment of the present invention is composed of 8 lens components of 10 lens elements as illustrated in FIG. 4A and FIG. 4B so as to satisfy the conditions (1) through (6). The fourth embodiment is an example wherein the wide-angle lens system has a composition similar to that of the third embodiment and is capable of correcting aberrations favorably by using only one aspherical surface, i.e., in a number smaller by one than that of the aspherical surfaces used in the third embodiment, as an image side surface of the third lens element disposed in the rear unit. Also in the fourth embodiment, an airspace ($d_4$) reserved between the second lens element and the third lens element disposed in the first lens unit of the front unit as well as another airspace ($d_{11}$) reserved between the sixth lens element and the seventh lens element disposed in the front unit is used as a floating space which is to be narrowed for reducing the variations of aberrations to be caused by focusing the wide-angle lens system from the object located at the infinite distance to the object located at the extremely short distance.

The fourth embodiment has the aberration characteristics illustrated in FIG. 17A, FIG. 17B, FIG. 17C, FIG. 17D, FIG. 17E and FIG. 17F when it is focused on the object located at the infinite distance in the condition shown in FIG. 4A or the aberration characteristics illustrated in FIG. 18A, FIG. 18B, FIG. 18C, FIG. 18D, FIG. 18E and FIG. 18F when it is focused on the object located at the extremely short distance in the condition shown in FIG. 4B (set at a magnification of $-\frac{1}{5}.0X$).

Figure 5A:
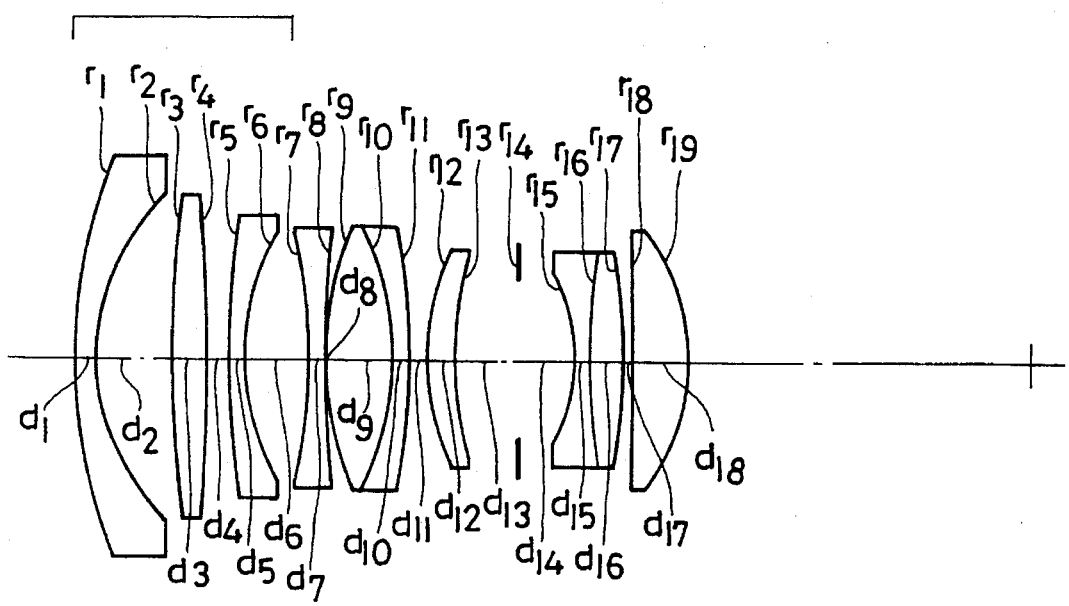
FIG. 5A and FIG. 5B show sectional views illustrating a composition of a fifth embodiment of the wide-angle lens system according to the present invention.
Figure 5B:
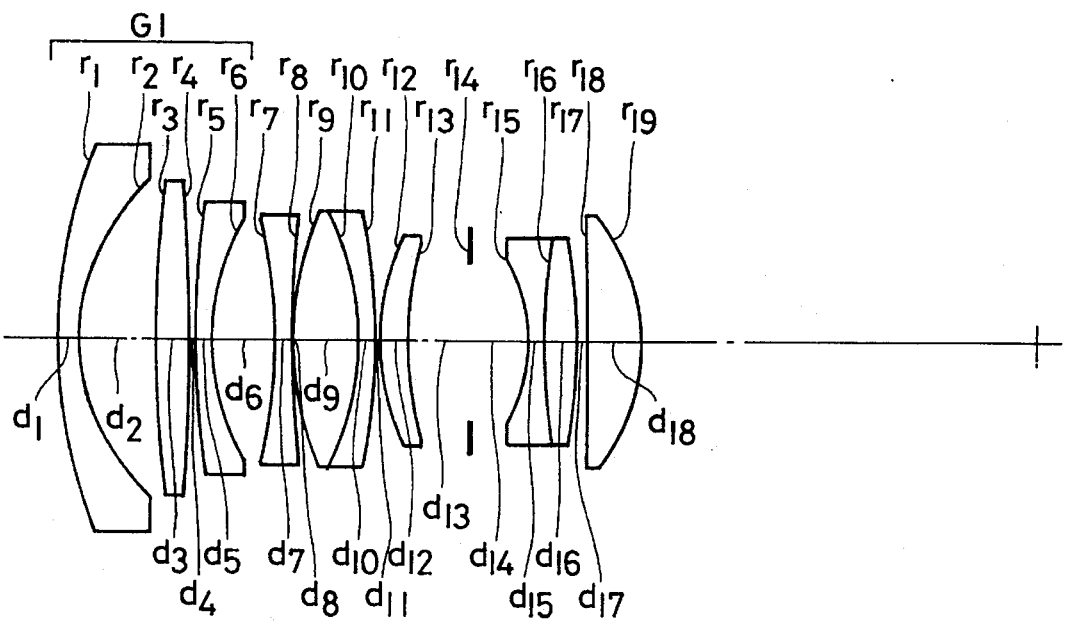

The fifth embodiment of the present invention consists of 8 lens components of 10 lens elements as shown in FIG. 5A and FIG. 5B so as to satisfy the conditions (1) through (6). The fifth embodiment is, like the fourth embodiment, an example wherein aberrations are corrected favorably by using a single aspherical surface. In the fifth embodiment in particular, an image side surface ($r_{17}$) of the second lens element disposed in the rear unit is selected as the aspherical surface for reducing an effective diameter of the aspherical surface. Also in the fifth embodiment, an airspace ($d_4$) reserved between the second lens element and the third lens element disposed in the front unit as well as another airspace ($d_{11}$) reserved between the sixth lens element and the seventh lens element disposed in the front unit is used as a floating space which is narrowed for reducing the variations of aberrations to be caused by focusing the wide-angle lens system from the object located at the infinite distance to the object located at the extremely short distance.

The fifth embodiment has the aberration characteristics illustrated in FIG. 19A, FIG. 19B, FIG. 19C, FIG. 19D, FIG. 19E and FIG. 19F when it is focused on the object located at the infinite distance in the condition shown in FIG. 5A or the aberration characteristics illustrated in FIG. 20A, FIG. 20B, FIG. 20C, FIG. 20D, FIG. 20E and FIG. 20F when it is focused on the object located at the extremely short distance in the condition shown in FIG. 5B (set at a magnification of $-\frac{1}{5}.6X$).

Figure 6A:
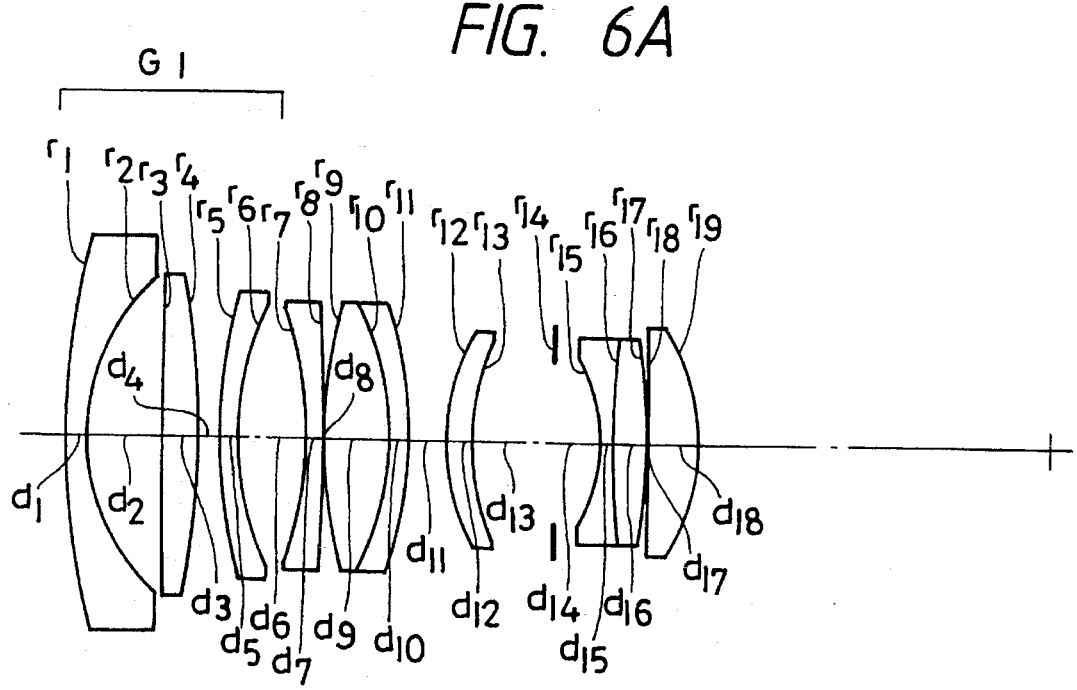
FIG. 6A and FIG. 6B show sectional views illustrating a composition of a sixth embodiment of the wide-angle lens system according to the present invention.
Figure 6B:
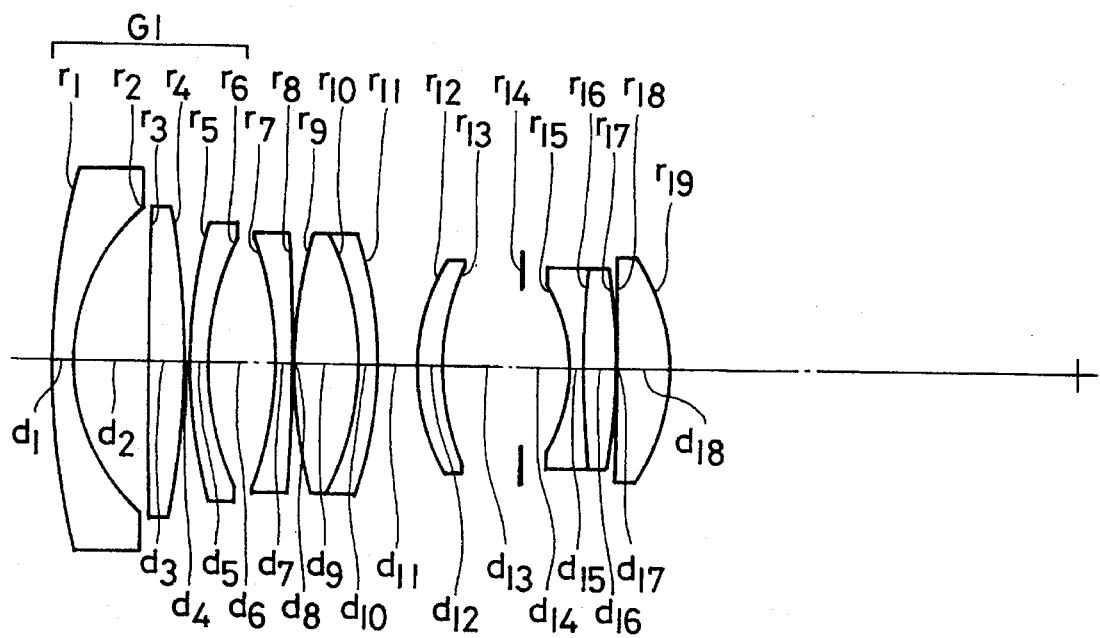

The sixth embodiment of the present invention consists of 8 lens components of 10 lens elements as illustrated in FIG. 6A and FIG. 6B, like the fifth embodiment, and is configured so as to favorably correct aberrations by using an aspherical surface disposed similarly to that used in the fifth embodiment. In the sixth embodiment, only one airspace ($d_4$) reserved between the second lens element and the third lens element disposed in the front unit is used as a floating space which is to be narrowed for reducing the variations of aberrations to be caused by focusing the wide-angle lens system from the object located at the infinite distance to the object located at the extremely short distance.

The sixth embodiment has the aberration characteristics illustrated in FIG. 21A, FIG. 21B, FIG. 21C, FIG. 21D, FIG. 21E and FIG. 21F when it is focused on the object located at the infinite distance in the condition shown in FIG. 6A or the aberration characteristics illustrated in FIG. 22A, FIG. 22B, FIG. 22C, FIG. 22D, FIG. 22E and FIG. 22F when it is focused on the object located at the extremely short distance.

The aspherical surfaces used in the embodiments of the present invention described above have shapes which are expressed by the following formula:

$$x = \frac{y^2/r}{1 + \sqrt{1 - p(y/r)^2}} + \sum_{i=2}^{n} A_{2i} y^{2i}$$

wherein an intersection between the optical axis and an aspherical surface of interest is taken as an origin, the direction of the optical axis is takes as the x axis and the direction perpendicular to the optical axis is taken as the y axis on a coordinates system; and the reference symbol r represents a radius of curvature on a reference sphere of the aspherical surface, the reference symbol p designates a conical constant, and the reference symbol $A_{2i}$ denotes an aspherical surface coefficient.

Figure 7A:
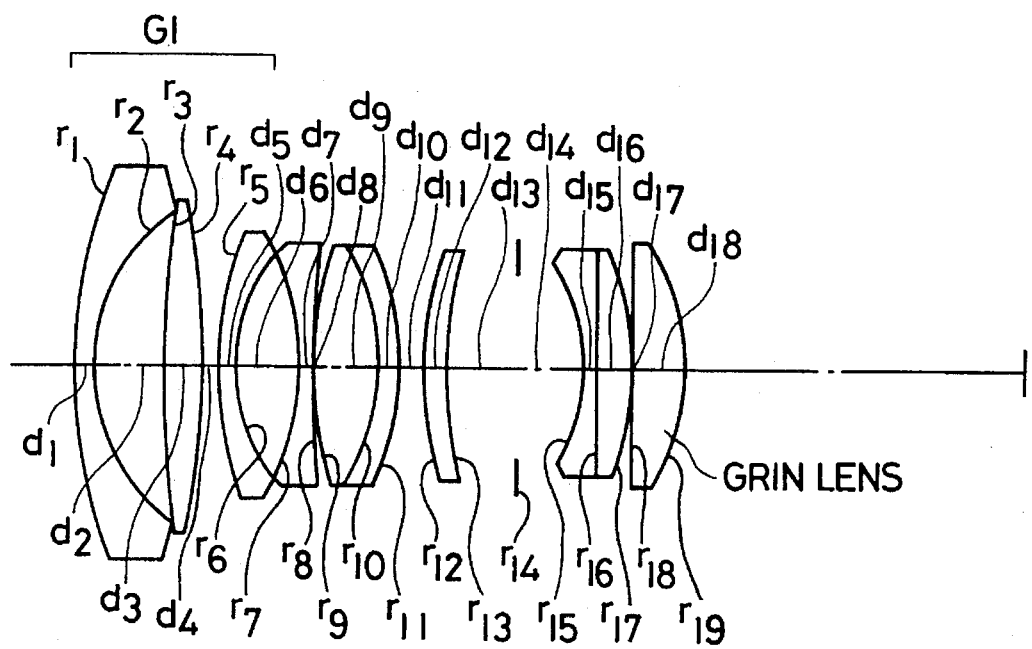
FIG. 7A and FIG. 7B show sectional views illustrating a composition of a seventh embodiment of the wide-angle lens system according to the present invention.
Figure 7B:
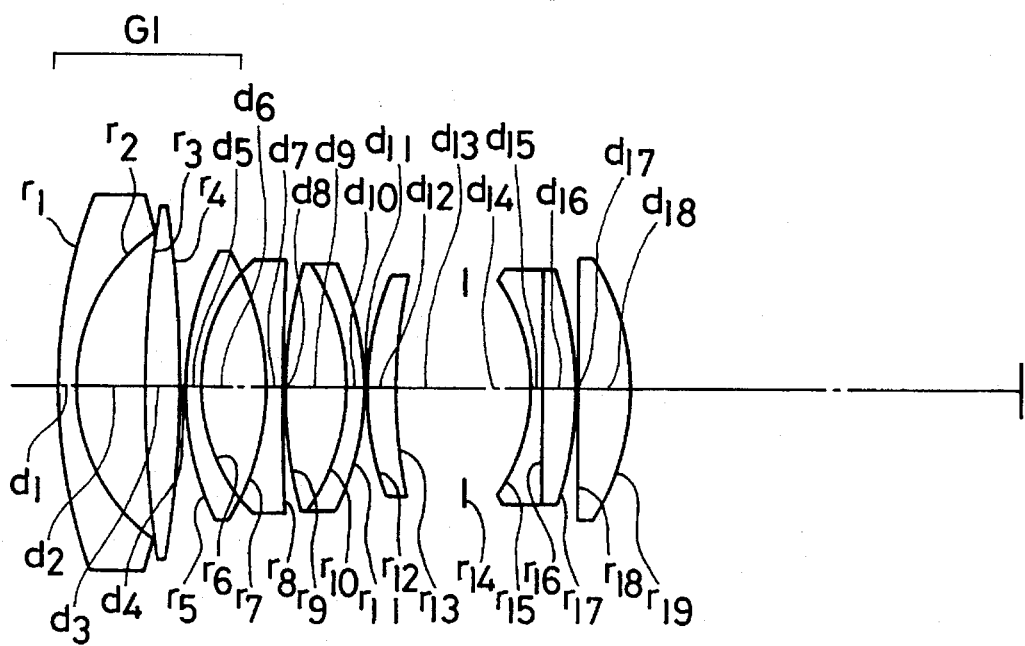

The seventh embodiment of the present invention is composed of 8 lens components of 10 lens elements as shown in FIG. 7A and FIG. 7B so as to satisfy the conditions (1) through (5) and the condition (7). In the seventh embodiment, the lens component which is disposed on the image side in the rear unit is configured as a graded refractive index lens component having a refractive index distribution in the direction along the optical axis. Further, an airspace $d_4$ reserved between the second lens element and the third lens element disposed in the first lens unit as well as another airspace $d_{11}$ reserved between the cemented lens component and the image side lens component is varied for focusing the wide-angle lens system from the object located the at infinite distance to the object located at the extremely short distance.

The seventh embodiment has the aberration characteristics illustrated in FIG. 23A, FIG. 23B, FIG. 23C, FIG. 23D, FIG. 23E and FIG. 23F when it is focused on the object located at the infinite distance in the condition shown in FIG. 7A or the aberration characteristics illustrated in FIG. 24A, FIG. 24B, FIG. 24C, FIG. 24D, FIG. 24E and FIG. 24F when it is focused on the object located at the extremely short distance in the condition shown in FIG. 7B (set at a magnification of 0.19871X).

Figure 8A:
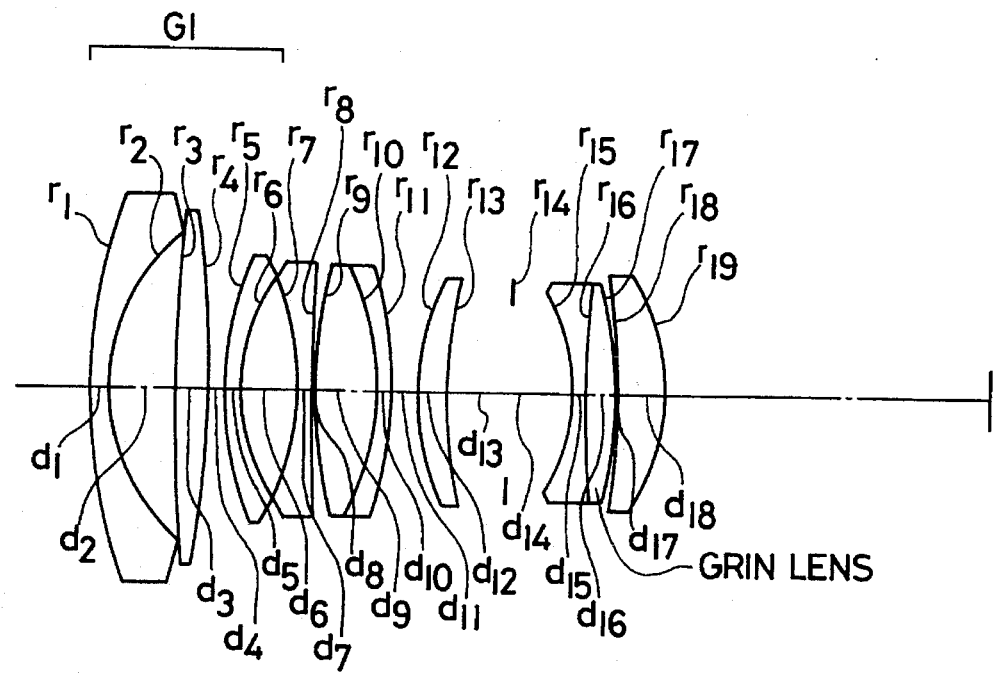
FIG. 8A and FIG. 8B show sectional views illustrating a composition of an eighth embodiment of the wide-angle lens system according to the present invention.
Figure 8B:
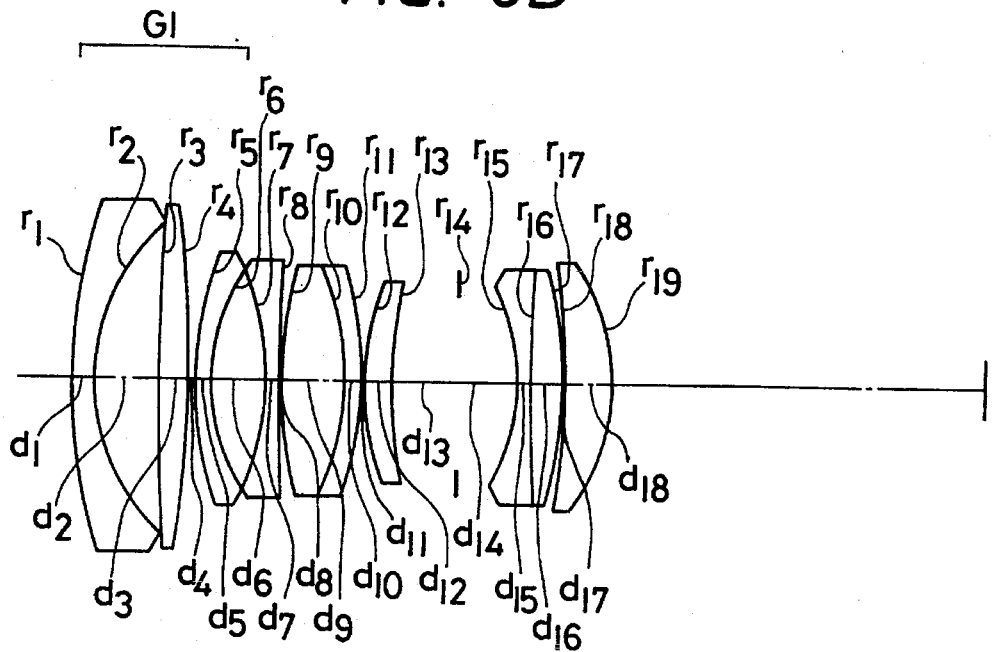

The eighth embodiment of the present invention has the composition illustrated in FIG. 8A and FIG. 8B, or is composed of 8 lens components of 10 lens elements so as to satisfy the conditions (1) through (5) and the condition (7). In the eighth embodiment, an image side lens element (named as "GRIN lens") of the cemented lens component disposed in the rear unit is configured as a graded refractive index lens element which has a refractive index distribution in the direction along the optical axis. Further, the wide-angle lens system preferred as the eighth embodiment of the present invention is focused from the object located at the infinite distance to the object located at the extremely short distance by narrowing an airspace reserved between the second lens element and the third lens element disposed in the first lens unit of the front unit as well as another airspace reserved between the cemented lens component and the image side lens component disposed in the front unit.

The eighth embodiment has the aberration characteristics illustrated in FIG. 25A, FIG. 25B, FIG. 25C, FIG. 25D, FIG. 25E and FIG. 25F when it is focused on the object located at the infinite distance in the condition shown in FIG. 8A. When the eighth embodiment is set in the condition shown in FIG. 8B (at a magnification of 0.1987X), it has the aberration characteristics illustrated in FIG. 26A, FIG. 26B, FIG. 26C, FIG. 26D, FIG. 26E and FIG. 26F.

Figure 9A:
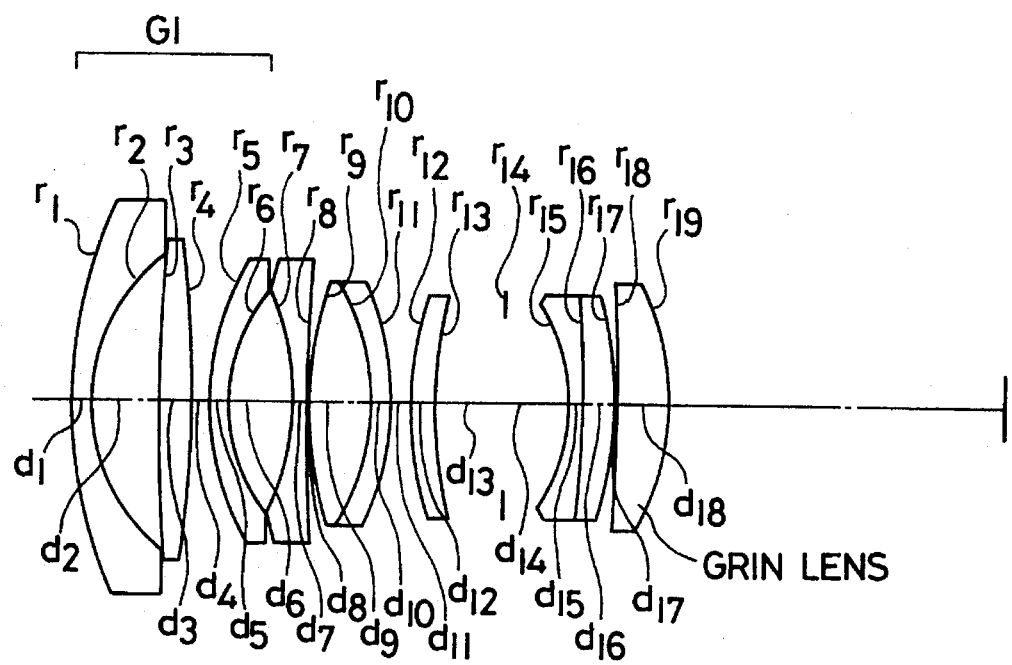
FIG. 9A and FIG. 9B show sectional views illustrating a composition of a ninth embodiment of the wide-angle lens system according to the present invention.
Figure 9B:
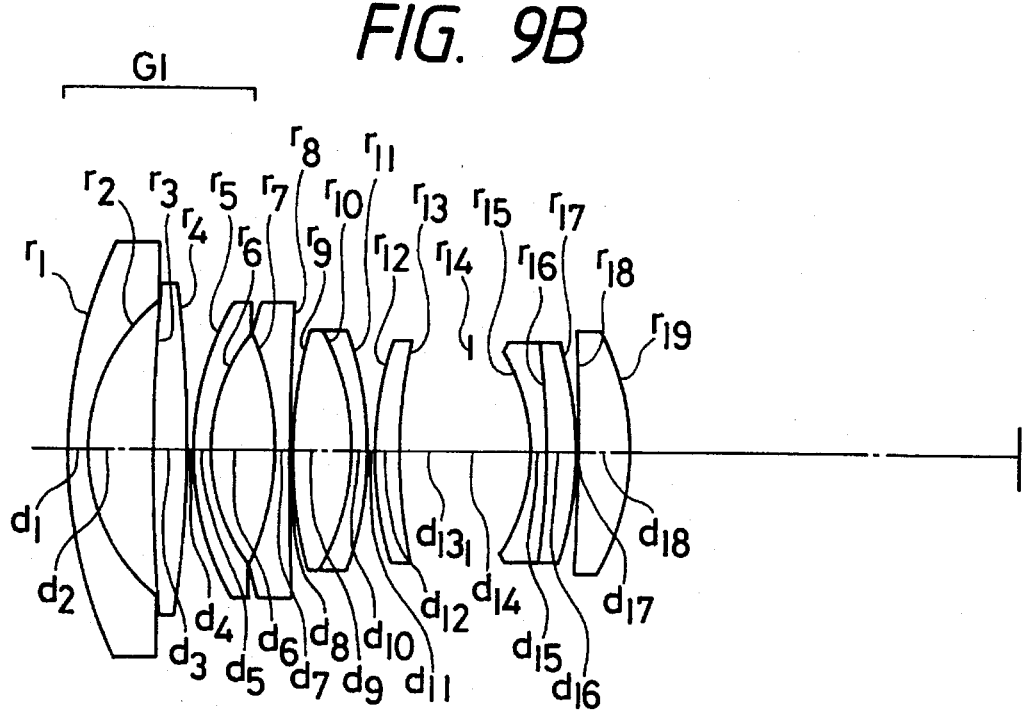

The ninth embodiment of the present invention has the composition illustrated in FIG. 9A and FIG. 9B or is composed of 8 lens components of 10 lens elements so as to satisfy the conditions (1) through (5) and the condition (7). In the ninth embodiment, the lens component which is disposed on the image side in the rear unit (named as "GRIN lens") is configured as a graded refractive index lens component which has a refractive index distribution in the direction along the optical axis. Further, the wide-angle lens system preferred as the ninth embodiment is focused on objects located within a range from the infinite distance to the extremely short distance by varying an airspace reserved between the second lens element and the third lens element disposed in the first lens unit of the front unit and another airspace reserved between the cemented lens component and the image side lens component disposed in the front unit.

When the ninth embodiment is focused on the object located at the infinite distance in the condition shown in FIG. 9A, it has the aberration characteristics illustrated in FIG. 27A, FIG. 27B, FIG. 27C, FIG. 27D, FIG. 27E and FIG. 27F. When the ninth embodiment is focused on the object located at the extremely short distance (set at a magnification of 0.19871X), it has the aberration characteristics illustrated in FIG. 28A, FIG. 28B, FIG. 28C, FIG. 28D, FIG. 28E and FIG. 28F.

Figure 10A:
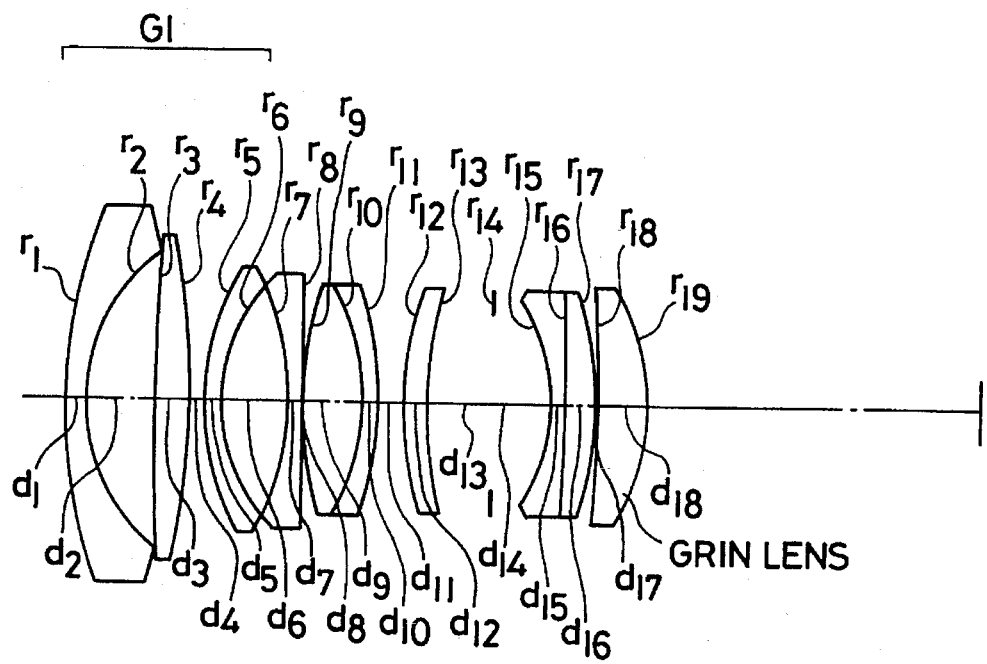
FIG. 10A and FIG. 10B show sectional views illustrating a composition of a tenth embodiment of the wide-angle lens system according to the present invention.
Figure 10B:
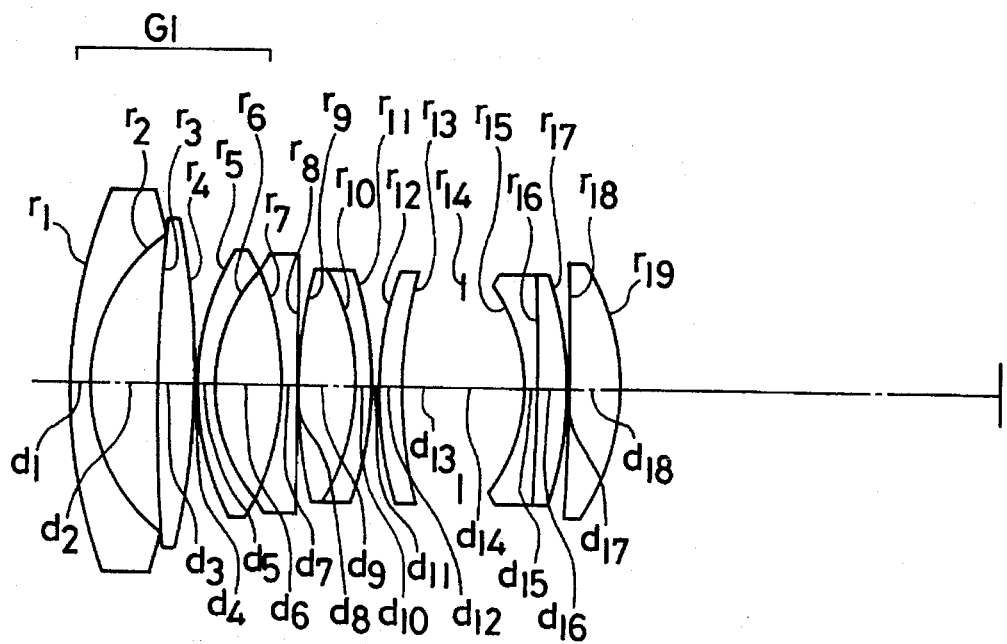

The wide-angle lens system preferred as the tenth embodiment of the present invention has the composition shown in FIG. 10A and FIG. 10B, or is composed of 8 lens components of 10 lens elements so as to satisfy the conditions (1) through (5) and the condition (7). In the tenth embodiment, the lens component disposed on the image side in the rear unit (named as "GRIN lens") is configured as a graded refractive index lens component. Further, the tenth embodiment is focused on objects located within a range from infinite distance to the extremely short distance by varying an airspace reserved between the first lens element and the second lens element disposed in the first lens unit of the front unit as well as another airspace reserved between the cemented lens component and the image side lens component disposed in the front unit.

When the tenth embodiment is focused on the object located at the infinite distance in the condition shown in FIG. 10A, it has the aberration characteristics illustrated in FIG. 29A, FIG. 29B, FIG. 29C, FIG. 29D, FIG. 29E and FIG. 29F. When the tenth embodiment is focused on the object located at the extremely short distance in the condition shown in FIG. 10B (set at a magnification of 0.19871X), it has the aberration characteristics illustrated in FIG. 30A, FIG. 30B, FIG. 30C, FIG. 30D, FIG. 30E and FIG. 30F.

The seventh through the tenth embodiments of the present invention described above are examples wherein graded refractive index lens components which have refractive index distributions in the direction along the optical axis are used in place of the aspherical surfaces. Out of the graded refractive index lens components used in these embodiments, each of the graded refractive index lens components adopted for the seventh embodiment and the eighth embodiment has a point of x=0 at a location on the optical axis 2 mm apart from an object side vertex toward the image side and a standard plane which passes through this point in a direction perpendicular to the optical axis. This graded refractive index lens component is made of a homogenous medium having a refractive index $N_0$ within a range from the object side surface to the standard plane and has a refractive index distribution specified in the numerical data from the standard plane toward the image side. Further, each of the graded refractive index lens components used in the ninth and tenth embodiments has a point of x=0 at an object side vertex and a standard plane passing through this point in the direction perpendicular to the optical axis. This graded refractive index lens component has a refractive index distribution specified in the numerical data from the standard plane toward the image side.

The present invention makes it possible to obtain, by adopting the composition described above, a retrofocus type bright wide-angle lens system in which aberrations, in particular negative distortion, curvature of image surface and sagittal coma, are corrected sufficiently.

We claim:

1. A wide-angle lens system comprising, in order from the object side: a front unit, a stop and a rear unit; wherein said front unit comprises, in order from the object side, a first lens unit which comprises a plurality of lens components including a positive lens component and has a negative refractive power as a whole, a negative lens component which has a concave surface on the object side as well as air-contact surfaces on the object side and the image side, and a cemented lens component, and wherein said rear unit comprises a negative lens component disposed at a location closest to said stop and at least two positive lens components disposed on the image side of said negative lens component.

2. A wide-angle lens system according to claim 1 wherein said front unit comprises at least one aspherical surface having a positive refractive power which is strengthened as portions of said aspherical surface are farther from an optical axis.

3. A wide-angle lens system according to claim 1 wherein said rear unit comprises at least one aspherical surface having a positive refractive power which is weakened as portions of said aspherical surface are farther from an optical axis.

4. A wide-angle lens system according to claim 1 wherein said lens system is focused on objects located within a range from an infinite distance to a short distance by varying at least one of airspaces reserved in said lens system.

5. A wide-angle lens system according to claim 4 wherein said lens system is focused on the objects located within the range from the infinite distance to the short distance by varying airspaces reserved in said first lens unit relatively to each other.

6. A wide-angle lens system according to claim 5 wherein said airspace is narrowed for focusing said lens system from the object located at the infinite distance onto the object located at the short distance.

7. A wide-angle lens system according to claim 4 wherein said lens system is focused onto the objects located within the range from the infinite distance to the short distance by varying airspaces reserved in said rear unit relatively to each other.

8. A wide-angle lens system according to claim 1 wherein said lens system is focused onto the objects located within the range from the infinite distance to the short distance by varying an airspace reserved between said first lens unit and said stop.

9. A wide-angle lens system according to claim 4 wherein said lens system is focused onto the objects located within the range from the infinite distance to the short distance by varying an airspace reserved between said first lens unit and said stop.

10. A wide-angle lens system according to claim 1, 2, 3, 4, 5, 6, 7, 8 or 9 satisfying the following condition (1):

$$-2.0 < f/f_1 < -0.2 \quad (1)$$

wherein the reference symbol f represents a focal length of said lens system as a whole and the reference symbol $f_1$ designates a focal length of said first lens unit.

11. A wide-angle lens system according to claim 1, 2, 3, 4, 5, 6, 7, 8 or 9 satisfying the following condition (2):

$$0.2 < f/f_R < 1.0 \quad (2)$$

wherein the reference symbol f represents a focal length of said lens system as a whole and the reference symbol $f_R$ designates a focal length of said rear unit.

12. A wide-angle lens system according to claim 1, 2, 3, 4, 5, 6, 7, 8 or 9 satisfying the following condition (3):

$$-1.0 < (R_F + R_R)/(R_F - R_R) < 0 \quad (3)$$

wherein the reference symbols $R_F$ and $R_R$ represent radii of curvature on an object side surface and an image side surface respectively of an air lens formed between: an image side surface of the negative lens component which is comprised in the first lens unit and an object side surface of the negative lens component arranged on the object side of the cemented lens component in the front unit.

13. A wide-angle lens system according to claim 1, 2, 3, 4, 5, 6, 7, 8 or 9 satisfying the following condition (4):

$$0 < (R_{FS} + R_{RS})/(R_{FS} - R_{RS}) < 1.0 \quad (4)$$

wherein the reference symbol $R_{FS}$ represents a radius of curvature on a surface which is disposed on the object side of said stop and closest to said stop, and the reference symbol $R_{RS}$ designates a radius of curvature on a surface which is disposed on the image side of said stop and closest to said stop.

14. A wide-angle lens system according to claim 1, 2, 3, 4, 5, 6, 7, 8 or 9 satisfying the following condition (5):

$$0.1 < D_C/f < 1.0 \quad (5)$$

wherein the reference symbol f represents a focal length of said lens system as a whole and the reference symbol $D_C$ designates thickness, as measured on the optical axis, of said cemented lens component disposed in said front unit.

15. A wide-angle lens system according to claim 3 satisfying the following condition (6):

$$1.0 \times 10^{-5} < |\Delta x|/f < 1.0 \times 10^{-1} \quad (6)$$

wherein the reference symbol $\Delta x$ represents a departure from a reference sphere of said aspherical surface at a height at which a marginal ray passes through said aspherical surface and the reference symbol f designates a focal length of said wide-angle lens system as a whole.

16. A wide-angle lens system according to claim 4, 5, 6, 7, 8 or 9 wherein said front unit comprises at least one aspherical surface having a positive refractive power which is strengthened as portions of said aspherical surface are farther from the optical axis.

17. A wide-angle lens system according to claim 4, 5, 6, 7, 8 or 9 wherein said rear unit comprises at least one aspherical surface having a positive refractive power which is weakened as portions of said aspherical surface are farther from the optical axis.

18. A wide-angle lens system according to claim 17 satisfying the following condition (6):

$$1.0 \times 10^{-5} < |\Delta x|/f < 1.0 \times 10^{-1} \quad (6)$$

wherein the reference symbol $\Delta x$ represents a departure from a reference sphere of said aspherical surface at a height at which a marginal ray passes through said aspherical surface and the reference symbol f designates a focal length of said wide-angle lens system as a whole.

19. A wide-angle lens system according to claim 1, 4, 5, 6 or 7 wherein said rear unit comprises at least one graded refractive index lens component which has a refractive index gradient in a direction along the optical axis.

20. A wide-angle lens system according to claim 19 wherein said refractive index lens component satisfies the following condition (7):

$$-1 < 1/(R \times N_1) < 0 \quad (7)$$

wherein the reference symbol $N_1$ represents a refractive index distribution coefficient of the first order and the reference symbol R designates a radius of curvature on a surface having a refractive index distribution when said refractive index lens component is made of a homogenous medium within a range from an optional point within this lens component to one surface thereof and another medium having a refractive index distribution within the rest range from said point to the other surface thereof or on a surface whichever has a smaller radius of curvature when a refractive index distribution is imparted over the entire range from one surface to the other surface of said graded refractive index lens component.

21. A wide-angle lens system according to claim 20 satisfying the following condition (1):

$$-2.0 < f/f_1 < -0.2 \quad (1)$$

wherein the reference symbol f represents a focal length of said lens system as a whole and the reference symbol $f_1$ designates a focal length of said first lens unit.

22. A wide-angle lens system according to claim 20 satisfying the following condition (2):

$$0.2 < f/f_R < 1.0 \quad (2)$$

wherein the reference symbol f represents a focal length of said lens system as a whole and the reference symbol $f_R$ designates a focal length of said rear unit.

23. A wide-angle lens system according to claim 20 satisfying the following condition (3):

$$-1.0 < (R_F + R_R)/(R_F - R_R) < 0 \quad (3)$$

wherein the reference symbols $R_F$ and $R_R$ represent radii of curvature on an object side surface and an image side surface respectively of an air lens formed between: an image side surface of the negative lens component which is comprised in the first lens unit and an object side surface of the negative lens component arranged on the object side of the cemented lens component in the front unit.

24. A wide-angle lens system according to claim 20 satisfying the following condition (4):

$$0<(R_{FS}+R_{RS})/(R_{FS}-R_{RS})<1.0 \qquad (4)$$

wherein the reference symbol $R_{FS}$ represents a radius of curvature on a surface which is disposed on the object side of said stop and closest to said stop, and the reference symbol $R_{RS}$ designates a radius of curvature on a surface which is disposed on the image side of said stop and closest to said stop.

25. A wide-angle lens system according to claim 20 satisfying the following condition (5):

$$0.1<D_C/f<1.0 \qquad (5)$$

wherein the reference symbol f represents a focal length of said lens system as a whole and the reference symbol $D_C$ designates thickness, as measured on the optical axis, of said cemented lens component disposed in said front unit.

26. A wide-angle lens system comprising, in order from the object side; a front unit comprising a plurality of lens components, a stop and a rear unit having a positive refractive power as a whole; wherein said front unit comprises a lens unit which comprises at least one positive lens component disposed on the object side therein and has a negative refractive power as a whole, and another lens unit which has a positive refractive power, and is disposed between said negative lens unit and said stop, and wherein said rear unit comprises at least one graded refractive index lens component which has a refractive index distribution in a direction along an optical axis.

27. A wide-angle lens system according to claim 26 satisfying the following condition (2):

$$0.2<f/f_R<1.0 \qquad (2)$$

wherein the reference symbol f represents a focal length of said lens system as a whole and the reference symbol $f_R$ designates a focal length of said rear unit.

28. A wide-angle lens system according to claim 26 satisfying the following condition (3):

$$-1.0<(R_F+R_R)/(R_F-R_R)<0 \qquad (3)$$

wherein the reference symbols $R_F$ and $R_R$ represent radii of curvature on an object side surface and an image side surface respectively of an air lens formed between: an image side surface of the negative lens component which is comprised in the first lens unit and an object side surface of the negative lens component arranged on the object side of the cemented lens component in the front unit.

29. A wide-angle lens system according to claim 26 satisfying the following condition (4):

$$0<(R_{FS}+R_{RS})/(R_{FS}-R_{RS})<1.0 \qquad (4)$$

wherein the reference symbol $R_{FS}$ represents a radius of curvature on a surface which is disposed on the object side of said stop and closest to said stop, and the reference symbol $R_{RS}$ designates a radius of curvature on a surface which is disposed on the image side of said stop and closest to said stop.

30. A wide-angle lens system according to claim 26 satisfying the following condition (5):

$$0.1<D_C/f<1.0 \qquad (5)$$

wherein the reference symbol f represents a focal length of said lens system as a whole and the reference symbol $D_C$ designates thickness, as measured on the optical axis, of said cemented lens component disposed in said front unit.

* * * * *